United States Patent
Sakino et al.

[11] Patent Number: 5,984,470
[45] Date of Patent: Nov. 16, 1999

[54] APPARATUS FOR PRODUCING COLOR FILTER WITH ALIGNMENT ERROR DETECTION

[75] Inventors: Shigeo Sakino, Yokohama; Kazuaki Masuda; Shinsuke Tsuruoka, both of Kawasaki; Toshikazu Sakai, Yokohama, all of Japan

[73] Assignee: Canon Kabushiki Kaisha, Tokyo, Japan

[21] Appl. No.: 08/634,409

[22] Filed: Apr. 18, 1996

[30] Foreign Application Priority Data

Apr. 20, 1995 [JP] Japan ................................. 7-094917
Apr. 21, 1995 [JP] Japan ................................. 7-118940

[51] Int. Cl.⁶ .............................. B41J 3/407; B41J 23/00
[52] U.S. Cl. ........................................... 347/106; 347/37
[58] Field of Search ................................. 347/106, 105, 347/1, 107, 8, 16, 2, 37, 43; 427/510, 511, 514, 555, 164; 349/889, 890, 891, 892; 358/296, 528; 430/7, 321

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,920,422 | 4/1990 | Lapierre | 346/29 |
| 5,576,070 | 11/1996 | Yaniv | 427/510 |
| 5,817,441 | 10/1998 | Iwata et al. | 347/106 |

FOREIGN PATENT DOCUMENTS

| | | |
|---|---|---|
| 54-056847 | 5/1979 | Japan . |
| 59-075205 | 4/1984 | Japan . |
| 59-123670 | 7/1984 | Japan . |
| 59-138461 | 8/1984 | Japan . |
| 60-071260 | 4/1985 | Japan . |
| 63-235901 | 9/1988 | Japan . |
| 01217320 | 8/1989 | Japan . |
| 05241011 | 9/1993 | Japan . |
| WO 21400 | 8/1995 | WIPO . |

*Primary Examiner*—N. Le
*Assistant Examiner*—L. Anderson
*Attorney, Agent, or Firm*—Fitzpatrick, Cella, Harper & Scinto

[57] ABSTRACT

This invention relates to a highly precise and efficient color filter producing apparatus, which is provided with at least a set of drawing heads for respectively generating ink jets of red, green and blue colors, movement device for moving, with a substrate on which a color filter is to be formed by drawing with said ink jets, in a plane having a predetermined distance from the drawing heads, displacement detection device for detecting relative displacement between the substrate and the drawing heads in directions of six degrees of freedom, device for detecting the reaching position on the substrate of the ink jet discharged from the drawing head, and alignment device for effecting alignment between the substrate and the drawing heads in directions of six degrees of freedom, based on the results of detection of the reaching position and of the relative displacement between the substrate and the drawing head in directions of six degrees of freedom.

20 Claims, 21 Drawing Sheets

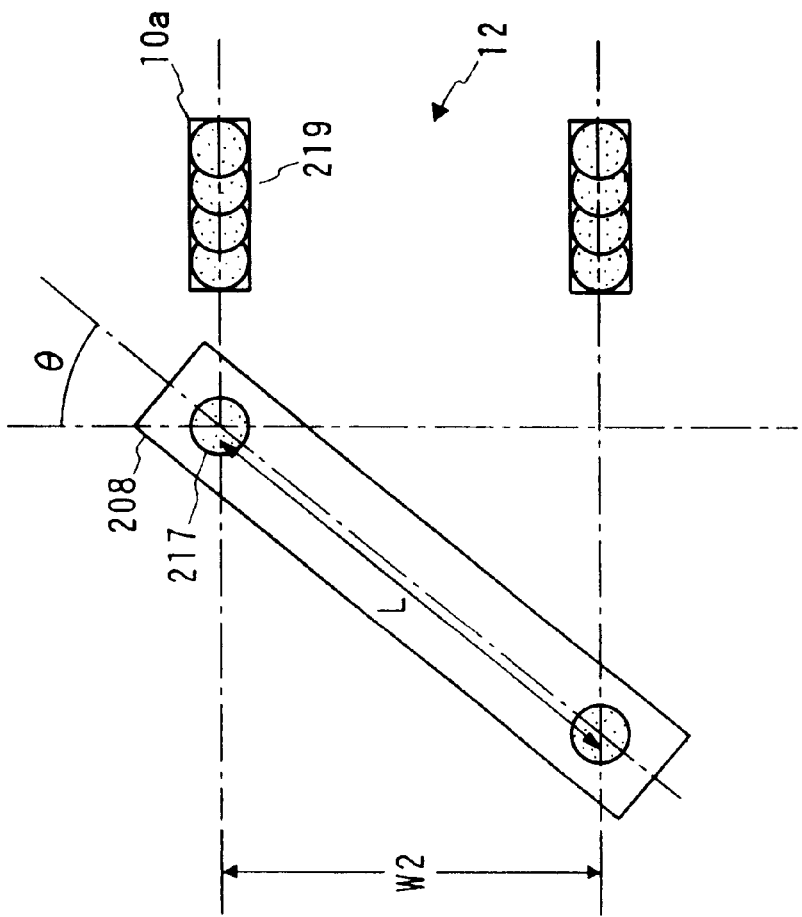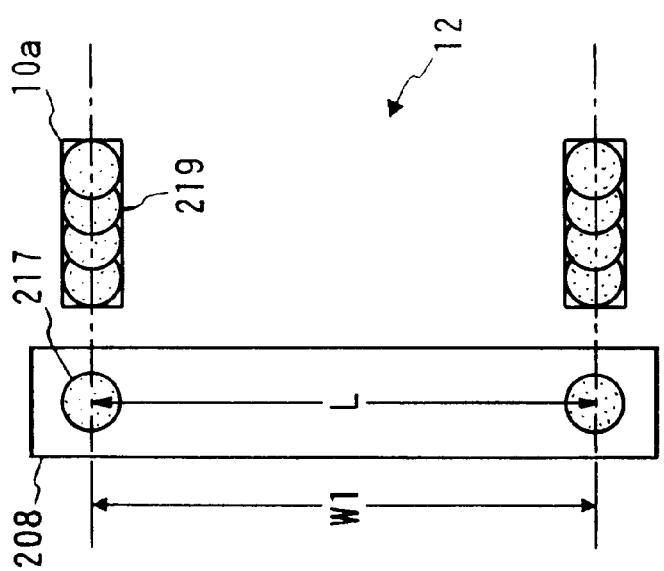

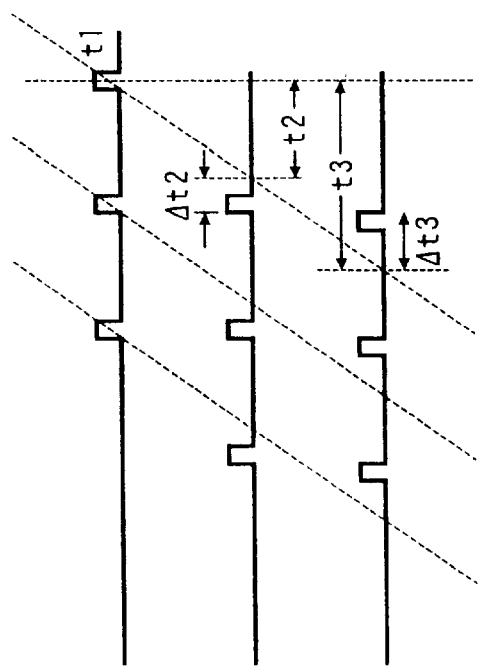
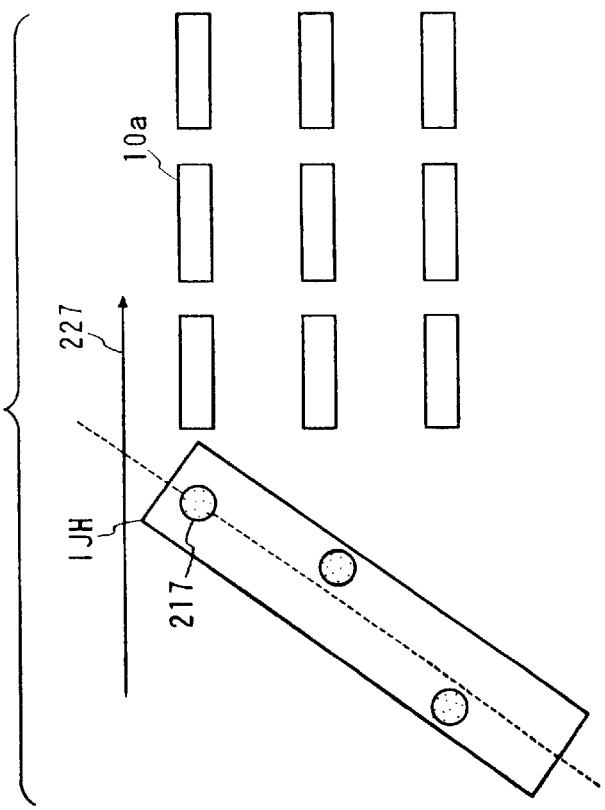

APPARATUS FOR PRODUCING COLOR FILTER WITH ALIGNMENT ERROR DETECTION

BACKGROUND OF THE INVENTION

1. Field of the Invention

The present invention relates to a technology for producing a color filter for a color liquid crystal display adapted for use in a color television, a personal computer or the like, and more particularly to a method and an apparatus for producing a color filter by arranging plural colored filter elements on an optically translucent substrate, the color filter, a liquid crystal display device and an apparatus having such liquid crystal display device.

2. Related Background Art

For producing the color filter, there are conventionally known the dyeing method, the pigment dispersion method, the electro-deposition method, the printing method etc.

The dyeing method prepares the color filter by forming a layer of a water-soluble polymer material, for dyeing, on a glass substrate, forming the above-mentioned material into a desired pattern by a photolithographic process, then immersing the glass substrate into a dyeing bath to obtain a colored pattern, and repeating this process three times for red, green and blue colors.

The pigment dispersion method prepares the color filter by forming a layer of photosensitive resin, in which pigment is dispersed, on a glass substrate, then patterning the resin layer to obtain a mono-colored pattern and repeating this process three times for red, green and blue colors.

The electrodeposition method prepares the color filter by forming a transparent electrode pattern on a glass substrate, then immersing the glass substrate in an electrodeposition liquid containing pigment, resin, electrolyte etc. for depositing a single color, and repeating this process three times for red, green and blue colors.

The printing method prepares the color filter by printing thermosetting resin, containing dispersed pigment, three times respectively for red, green and blue colors and then thermally setting the resin.

These four methods in common require repetition of a same process by three times for forming red, green and blue colors, and such large number of steps reduces the production yield and increases the cost.

Besides, the electrodeposition method is hardly applicable to the TFT liquid crystal display since the formable pattern is limited in shape. Also the printing method is limited in resolution and cannot therefore be applied to finer patterns.

In order to resolve these drawbacks, there is proposed a method of forming the filter pattern by ink jet emission onto the glass substrate, as disclosed in the Japanese Patent Laid-Open Application Nos. 59-75205, 63-235901, 1-217320 etc.

SUMMARY OF THE INVENTION

However, such technology utilizing ink jet has not yet been developed for the functions for production. More specifically, highly precise pattern formation is not possible because there has not been developed a system, for example, of measuring the reaching position of ink in advance, then aligning the glass substrate in directions of six degrees of freedom with respect to the drawing head (or aligning the drawing head with respect to the glass) in mounting the glass substrate on the manufacturing apparatus, and maintaining a constant gap between the drawing head and the glass substrate in pattern drawing. Also no consideration has been given on the productivity.

An object of the present invention is to resolve such drawbacks and to provide a method and an apparatus for producing the color filter, which are inexpensive and highly reliable, and are capable of satisfying the characteristics of the conventional methods, such as resolution, exploiting the feature of the ink jet method.

More specifically it is to enable highly precise drawing of each color pattern of red, green and blue colors on the substrate with measures for avoiding dusts and improving the productivity, and also to enable flexible adaptation for example to a change in the size of the substrate.

Another object of the present invention is to provide a color filter produced by the above-mentioned method or apparatus, a liquid crystal display device and an apparatus equipped with such liquid crystal display device.

The above-mentioned objects can be attained, according to the present invention, by an apparatus for producing a color filter comprising at least a set of drawing heads for respectively generating ink jets of red, green and blue colors, movement means for moving with a substrate on which the color filter is to be formed by drawing with ink jets, displacement detection means for detecting relative displacement between the substrate and the drawing heads, means for detecting the reaching position, on the substrate, of the ink jet discharged from the drawing head, and alignment means for effecting alignment between the substrate and the drawing head, based on the result of detection of the reaching position and that of the relative displacement.

It is also featured by facts that the drawing heads are fixed above the substrate and that the alignment means and the movement means are both adapted to move the substrate in the alignment and in the drawing operation.

It is further featured by a fact that, for each drawing head, its reaching position is detected in advance for a surface in a predetermined positional relationship thereto.

It is further featured by a fact that the length of the drawing heads of red, green and blue colors is equal to the width of the substrate in the drawing direction.

It is further featured by a fact that plural sets of drawing heads are arranged in parallel with an entire length equal to the width of the substrate in the drawing direction.

It is further featured by a facts that the drawing heads are adapted to independently generate ink jets of red, green and blue colors, that the movement means is adapted to move within a plane of a predetermined distance from the drawing heads and that the relative displacement and the alignment are achieved in the directions of six degrees of freedom.

Also according to the present invention, there is provided a method for producing a color filter in the above-mentioned apparatus by drawing on the substrate with the drawing heads under the movement of the substrate, comprising steps of detecting the relative displacement between the substrate and the drawing heads by the displacement detection means, detecting the reaching position, on the substrate, of the ink jet discharged from the drawing head, and effecting alignment between the substrate and the drawing head based on the result of detection of the reaching position and that of the relative displacement.

According to the present invention, in loading a substrate such as a glass substrate bearing a black matrix thereon on the movement means, there are detected the displacements in the X-direction (perpendicular to the head), the Y-direction (in the head scanning direction) and the θ-direction (rotation on the X-Y plane) by means of the displacement detection means for detecting the displacement of the alignment between the drawing head and the substrate, and the relative position between the head and the substrate is adjusted. The displacement is detected by detecting marks provided in two positions on the substrate with a microscope under the activation of the movement means, or by simultaneously detecting the marks on the substrate with two microscopes. The relative displacement, measured by the alignment microscope, is corrected by referring to the coordinate, measured in advance, between the reaching position of the ink discharged from the head and the alignment microscope (obtained for example by detecting the coordinates of the reaching position and the alignment position on the stage coordinate system). The drawing operation is conducted in reciprocating motions, with a constant gap control between the head and the substrate in the Z and tilt directions, under the measurement of the above-mentioned gap with a focusing sensor (or after only one measurement depending upon the accuracy).

In this manner, highly precise high-speed drawing can be achieved as the reaching position of ink is measured in advance. Also the relative position between the head and the substrate in the directions of six degrees of freedom is always maintained constant, thereby achieving a high precision in the drawing. Also the measurement and correction are performed in real time basis in the Z and tilt directions, an eventual directionality in the ink reaching position (in the scanning direction) can be adjusted by the ink discharge timing, thereby achieving the highly precise drawing operation. Also, even in case the direction of discharge is displaced perpendicularly to the scanning direction, the reaching position is always reproduced and the highly precise drawing operation can be achieved as the gap is always adjusted constant. Besides, the drawing operation in the reciprocating motions improves the productivity and facilitates adaptation to a larger substrate. Also the presence of the drawing heads of red, green and blue colors enables simultaneous drawing of three colors, thus reducing the process in comparison with the conventional process.

By precisely fixing the red, green and blue drawing heads so as to discharge the inks downwards and effecting the alignment of the substrate in six degrees of freedom all at the substrate stage side, there are no moving parts above the substrate, so that the dust dropping onto the substrate can be suppressed. Furthermore, in comparison with the movement of the heads or the microscope, that of the substrate involves a smaller mass, whereby the relative movement can be achieved with a higher speed and an improvement in the productivity can be achieved.

Furthermore, as the apparatus is provided thereon with means for measuring the reaching position of the drawing head, it is rendered possible to measure the head characteristics and the reaching position within the apparatus, thereby achieving highly precise drawing.

Furthermore, the use of the drawing head of which reaching position is measured in advance enables highly precise drawing operation and simplifies the configuration of the apparatus.

Also the three heads of red, green and blue colors having a length equal to the width of the substrate in the drawing direction reduces the number of drawing operations and thus improves the productivity. Besides the configuration of the apparatus can be simplified as the substrate need not be moved in the Y-direction (perpendicular to the head scanning direction).

Furthermore, the arrangement of plural sets of three heads in such a manner that their length is equal to the width of the substrate in the drawing direction facilitates adaptation to a change of the substrate size.

Also according to the present invention there is provided a method for producing a color filter by discharging a coloring material from an ink jet head under relative scanning motion with respect to an optically translucent substrate, thereby forming, on the substrate, a plurality of colored filter elements with the coloring material, comprising a first discharge step of discharging the coloring material with a predetermined pattern under a scanning motion of the ink jet head relative to a predetermined coloring member, a detection step of detecting the reaching position of the coloring material in the first discharge step on the above-mentioned member, a timing adjustment step of adjusting the discharge timing of the ink jet head, based on the result of detection of the reaching position of the coloring material, detected in the detection step, and a second discharge step of discharging the coloring material with the timing set in the timing adjustment step under a scanning motion of the ink jet head relative to the substrate thereby forming colored filter elements on the substrate.

It is further featured by a fact that the ink jet head mentioned above is adapted to effect ink discharge, utilizing thermal energy, and is provided with a thermal energy conversion member for generating thermal energy to be given to the ink.

Also according to the present invention there is provided a method for producing a color filter by discharging a coloring material from an ink jet head provided with plural discharge nozzles under a scanning motion relative to a translucent substrate, thereby forming, on the substrate, a plurality of colored filter elements with the coloring material, comprising a first discharge step of discharging the coloring material with a predetermined pattern under a scanning motion of the ink jet head relative to a predetermined member, a detection step of detecting the reaching position of the coloring material in the first discharge step on the above-mentioned member, a posture adjustment step of adjusting the posture of the ink jet head based on the result of detection of the reaching position of the coloring material on the above-mentioned coloring member, detected in the detection step, and a second discharge step of discharging the coloring material with the posture set in the posture adjustment step under a scanning motion of the ink jet head relative to the substrate thereby forming colored filter elements on the substrate.

It is further featured by a fact that the ink jet head mentioned above is adapted to effect ink discharge, utilizing thermal energy, and is provided with a thermal energy conversion member for generating thermal energy to be given to the ink.

Also according to the present invention, there is provided an apparatus for producing a color filter by forming a plurality of colored filter elements on an optically translucent substrate, comprising an ink jet head for discharging a coloring material onto the substrate under a movement relative thereto, thereby forming the colored filter elements, detection means for detecting the reaching position of the coloring material discharged by the ink jet head, and adjustment means for adjusting the discharge timing of the ink jet head, based on the information on the reaching position of the coloring material detected by the detection means.

It is further featured by a fact that the ink jet head mentioned above is adapted to effect ink discharge, utilizing thermal energy, and is provided with a thermal energy conversion member for generating thermal energy to be given to the ink.

Also according to the present invention, there is provided an apparatus for producing a color filter by forming a plurality of colored filter elements on an optically translucent substrate, comprising an ink jet head provided with plural discharge nozzles for discharging a coloring material onto the substrate under a movement relative thereto, thereby forming the colored filter elements, detection means for detecting the reaching position of the coloring material discharged by the ink jet head, and adjustment means for adjusting the posture of the ink jet head, based on the information on the reaching position of the coloring material detected by the detection means.

It is further featured by a fact that the ink jet head mentioned above is adapted to effect ink discharge, utilizing thermal energy, and is provided with a thermal energy conversion member for generating thermal energy to be given to the ink.

Also according to the present invention, there is provided an apparatus for producing a color filter by forming a plurality of colored filter elements on a translucent substrate, comprising an ink jet head provided with plural discharge nozzles for discharging a coloring material onto the substrate under a movement relative thereto, thereby forming the colored filter elements, and an adjustment mechanism for three-dimensional adjustment of the posture of the ink jet head.

It is also featured in that it further comprises detection means for detecting the reaching position of the coloring material discharged by the ink jet head.

It is further featured by a fact that the ink jet head mentioned above is adapted to effect ink discharge, utilizing thermal energy, and is provided with a thermal energy conversion member for generating thermal energy to be given to the ink.

Also according to the present invention there is provided a color filter formed by discharging a coloring material from an ink jet head onto an optically translucent substrate under a scanning motion of the ink jet head relative to the substrate thereby forming a plurality of colored filter elements with the coloring material on the substrate, the color filter being produced by a method comprising a first discharge step of discharging the coloring material with a predetermined pattern under a scanning motion of the ink jet head relative to a predetermined coloring member, a detection step of detecting the reaching position of the coloring material on the above-mentioned member in the first discharge step, a timing adjustment step of adjusting the discharge timing of the ink jet head based on the result of detection of the reaching position of the coloring material, detected in the detection step, and a second discharge step of discharging the coloring material with the timing set in the timing adjustment step under a scanning motion of the ink jet head relative to the substrate, thereby forming the colored filter elements on the substrate.

Also according to the present invention there is provided a color filter formed by discharging a coloring material from an ink jet head provided with plural discharge nozzles onto an optically translucent substrate under a scanning motion of the ink jet head relative to the substrate thereby forming a plurality of colored filter elements with the coloring material on the substrate, the color filter being produced by a method comprising a first discharge step of discharging the coloring material with a predetermined pattern under a scanning motion of the ink jet head relative to a predetermined coloring member, a detection step of detecting the reaching position of the coloring material on the above-mentioned member in the first discharge step, a posture adjustment step of adjusting the posture of the ink jet head based on the result of detection of the reaching position of the coloring material, detected in the detection step, and a second discharge step of discharging the coloring material with the posture set in the posture adjustment step under a scanning motion of the ink jet head relative to the substrate, thereby forming the colored filter elements on the substrate.

Also according to the present invention there is provided a liquid crystal display device comprising a color filter formed by discharging a coloring material from an ink jet head onto an optically translucent substrate under a scanning motion of the ink jet head relative to the substrate thereby forming a plurality of colored filter elements with the coloring material on the substrate, the color filter being produced by a method including a first discharge step of discharging the coloring material with a predetermined pattern under a scanning motion of the ink jet head relative to a predetermined member, a detection step of detecting the reaching position of the coloring material on the above-mentioned member in the first discharge step, a timing adjustment step of adjusting the discharge timing of the ink jet head based on the result of detection of the reaching position of the coloring material, detected in the detection step, and a second discharge step of discharging the coloring material with the timing set in the timing adjustment step under a scanning motion of the ink jet head relative to the substrate, thereby forming the colored filter elements on the substrate; another substrate opposed to the color filter; and liquid crystal compound sealed between the substrates.

Also according to the present invention there is provided a liquid crystal display device comprising a color filter formed by discharging a coloring material from an ink jet head provided with plural discharge nozzles onto an optically translucent substrate under a scanning motion of the ink jet head relative to the substrate thereby forming a plurality of colored filter elements with the coloring material on the substrate, the color filter being produced by a method including a first discharge step of discharging the coloring material with a predetermined pattern under a scanning motion of the ink jet head relative to a predetermined member, a detection step of detecting the reaching position of the coloring material on the above-mentioned member in the first discharge step, a posture adjustment step of adjusting the posture of the ink jet head based on the result of detection of the reaching position of the coloring material, detected in the detection step, and a second discharge step of discharging the coloring material with the posture set in the posture adjustment step under a scanning motion of the ink jet head relative to the substrate, thereby forming the colored filter elements on the substrate; another substrate opposed to the color filter; and liquid crystal compound sealed between the substrates.

Also according to the present invention there is provided an apparatus comprising a liquid crystal display device including a color filter formed by discharging a coloring material from an ink jet head onto an optically translucent substrate under a scanning motion of the ink jet head relative to the substrate thereby forming a plurality of colored filter elements with the coloring material on the substrate, the color filter being produced by a method including a first discharge step of discharging the coloring material with a predetermined pattern under a scanning motion of the ink jet head relative to a predetermined member, a detection step of detecting the reaching position of the coloring material on the above-mentioned member in the first discharge step, a timing adjustment step of adjusting the discharge timing of the ink jet head based on the result of detection of the reaching position of the coloring material, detected in the detection step, and a second discharge step of discharging the coloring material with the timing set in the timing adjustment step under a scanning motion of the ink jet head relative to the substrate, thereby forming the colored filter elements on the substrate, another substrate opposed to the color filter, and liquid crystal compound sealed between the substrates; and image signal output means for supplying the liquid crystal display device with an image signal.

Also according to the present invention there is provided an apparatus comprising a liquid crystal display device including a color filter formed by discharging a coloring material from an ink jet head provided with plural discharge nozzles onto an optically translucent substrate under a scanning motion of the ink jet head relative to the substrate thereby forming a plurality of colored filter elements with the coloring material on the substrate, the color filter being produced by a method including a first discharge step of discharging the coloring material with a predetermined pattern under a scanning motion of the ink jet head relative to a predetermined coloring member, a detection step of detecting the reaching position of the coloring material on the above-mentioned member in the first discharge step, a posture adjustment step of adjusting the posture of the ink jet head based on the result of detection of the reaching position of the coloring material, detected in the detection step, and a second discharge step of discharging the coloring material with the posture set in the posture adjustment step under a scanning motion of the ink jet head relative to the substrate, thereby forming the colored filter elements on the substrate, another substrate opposed to the color filter, and liquid crystal compound sealed between the substrates; and image signal output means for supplying the liquid crystal display device with an image signal.

According to the present invention, even if the plural discharge nozzles of the ink jet head are aberrated in position, the coloring material can be deposited on an exact position on the substrate by respectively adjusting the discharge timing of the coloring material from each discharge nozzle, thereby allowing to produce a highly precise color filter.

Also, even if the plural discharge nozzles of the ink jet head are aberrated in position, the coloring material can be deposited on an exact position on the substrate by the adjustment of the posture of the ink jet head so as to bring each discharge nozzle to an exact position.

BRIEF DESCRIPTION OF THE DRAWINGS

FIGS. 18A and 18B are views showing the positional relationship among a coloring head, a correcting head and a translucent portion formed on a glass substrate to be colored;

FIGS. 25A and 25B are views showing the relationship between the coloring head and the translucent portion when the discharge nozzles of the coloring head are scattering displaced;

DETAILED DESCRIPTION OF THE PREFERRED EMBODIMENTS

Figure 1A:
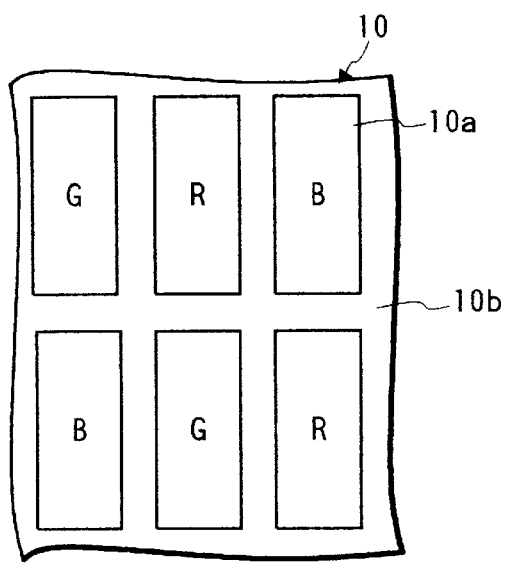
FIGS. 1A and 1B are partial magnified views of color filters produced by the method and apparatus of the present invention.
Figure 1B:
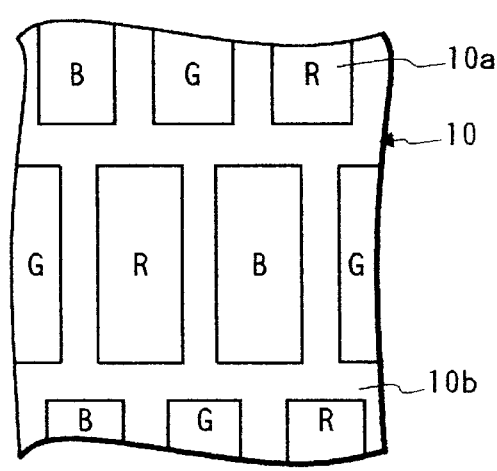

FIGS. 1A and 1B are partial magnified views of color filters produced by the method and apparatus of the present invention.

The color filter 10, constituting the front face of a color liquid crystal display employed for example in a portable personal computer, is composed, as shown in FIGS. 1A and 1B, of a two-dimensional array for example of a grid pattern of filter elements 10a colored in red (R), green (G) and blue (B). FIG. 1A shows an arrangement of the filter elements 10a in a simple checkerboard pattern, while FIG. 1B shows an arrangement in a staggered checkerboard pattern. Between the filter elements 10a, there is formed a light shielding frame 10b for forming a clear partition between the filter elements 10a thereby making the image clearer.

Figure 2:
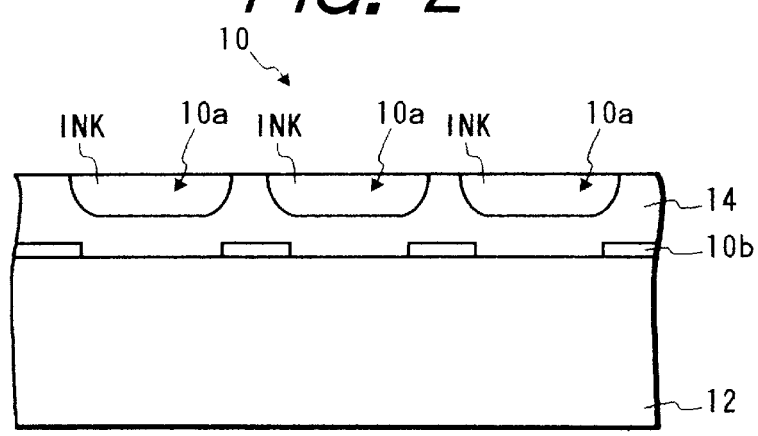
FIG. 2 is a lateral cross-sectional view of the color filter shown in FIGS. 1A and 1B.

FIG. 2 is a lateral cross-sectional view of the color filter 10 shown in FIGS. 1A and 1B, illustrating a glass substrate 12 constituting the main body of the color filter 10, a light shielding frame 10b and filter elements 10a of the different colors formed thereon.

In producing the color filter 10, chromium is deposited by sputtering on the glass substrate 12, and is photolithographically formed into a grating pattern, thereby obtaining the light shielding frame 10b. Then a liquid-absorbing dyed layer 14, composed for example of cellulose, acrylic resin or gelatin, is formed on the light shielding frame 10b, and liquid droplets (hereinafter called ink) containing a coloring material (dye) are sprayed by an ink jet recording head onto a filter element forming area of the dyed layer 14, whereby the layer 14 is colored to constitute the colored filter element 10a. It is also possible to use pigment instead of dye, or to use UV curable ink. The dyed layer 14 may be dispensed with in case of using such pigment or UV curable ink.

Then a protective layer is formed if required. The protective layer can be composed, for example, of a resinous material curable with light and/or heat, or an inorganic film formed by evaporation or sputtering, that is transparent on the color filter and can withstand the subsequent processes such as ITO (indium tin oxide) formation and orienting film formation.

Figure 3:
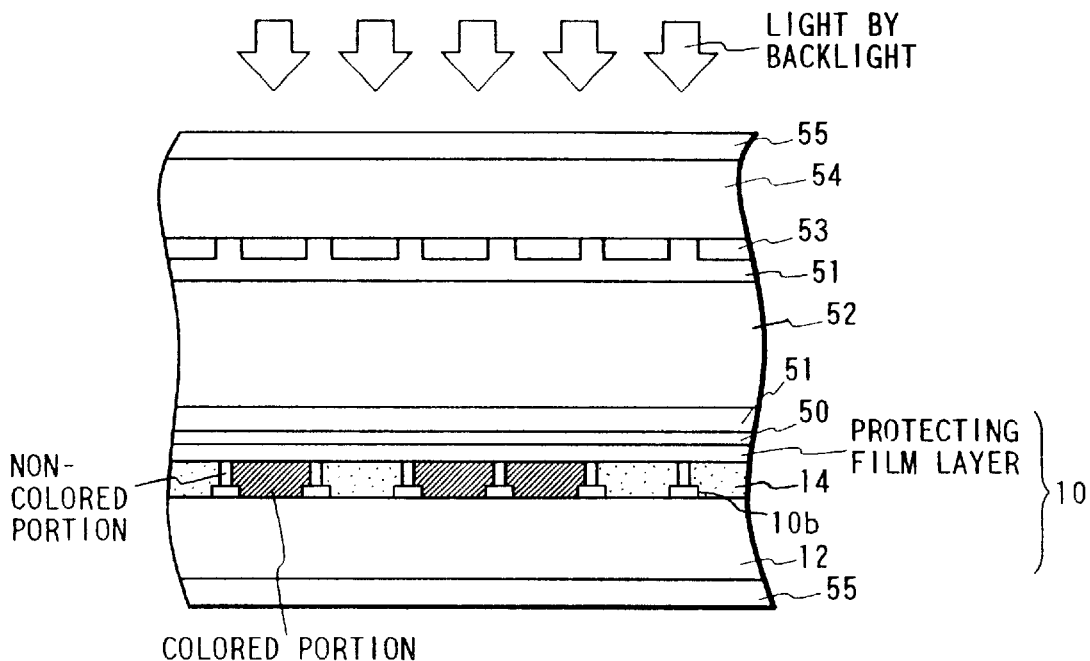
FIGS. 3 and 4 are lateral cross-sectional views showing the structure of a color liquid crystal display panel.
Figure 4:
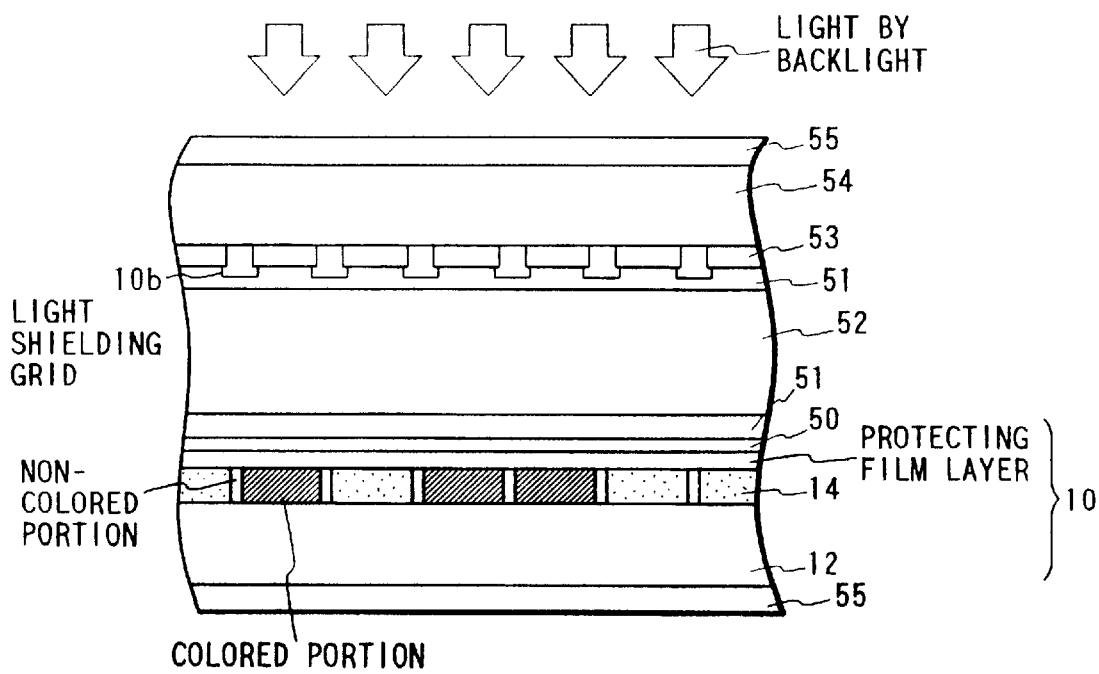

The color liquid crystal display panel is formed in general by placing the color filter substrate 12 and a counter substrate 54 in a mutually opposed relationship and sealing liquid crystal compound 52 therebetween. On the inner face of the substrate 54 of the liquid crystal panel, there are arranged TFT's (thin film transistors: not shown) and transparent pixel electrodes 53 in a matrix array. On the inner face of the other substrate 12, the color filter 10 is so formed that the R, G, B filter elements are respectively arranged in opposition to the pixel electrodes, and a transparent counter (common) electrode 50 is formed thereon over the entire area. The light shielding frame 10b is usually formed on the color filter substrate 12 (cf. FIG. 3), but it is formed on the opposed TFT substrate in case of the liquid crystal panel of BM (black matrix) on-array type (cf. FIG. 4). On the inner faces of both substrates there are formed oriented films 51, which are subjected to rubbing process for orienting the molecules of the liquid crystal in a specified direction. Polarizing plates 55 are adhered to the outer faces of the glass substrates, and the liquid crystal compound 52 is filled into the gap (about 2 to 5 microns) therebetween. The back light source is generally composed of a combination of a fluorescent lamp (not shown) and a diffusing plate (not shown), and the display is achieved by utilizing the liquid crystal compound as an optical shutter for varying the transmittance for the light of the back light source.

Figure 5:
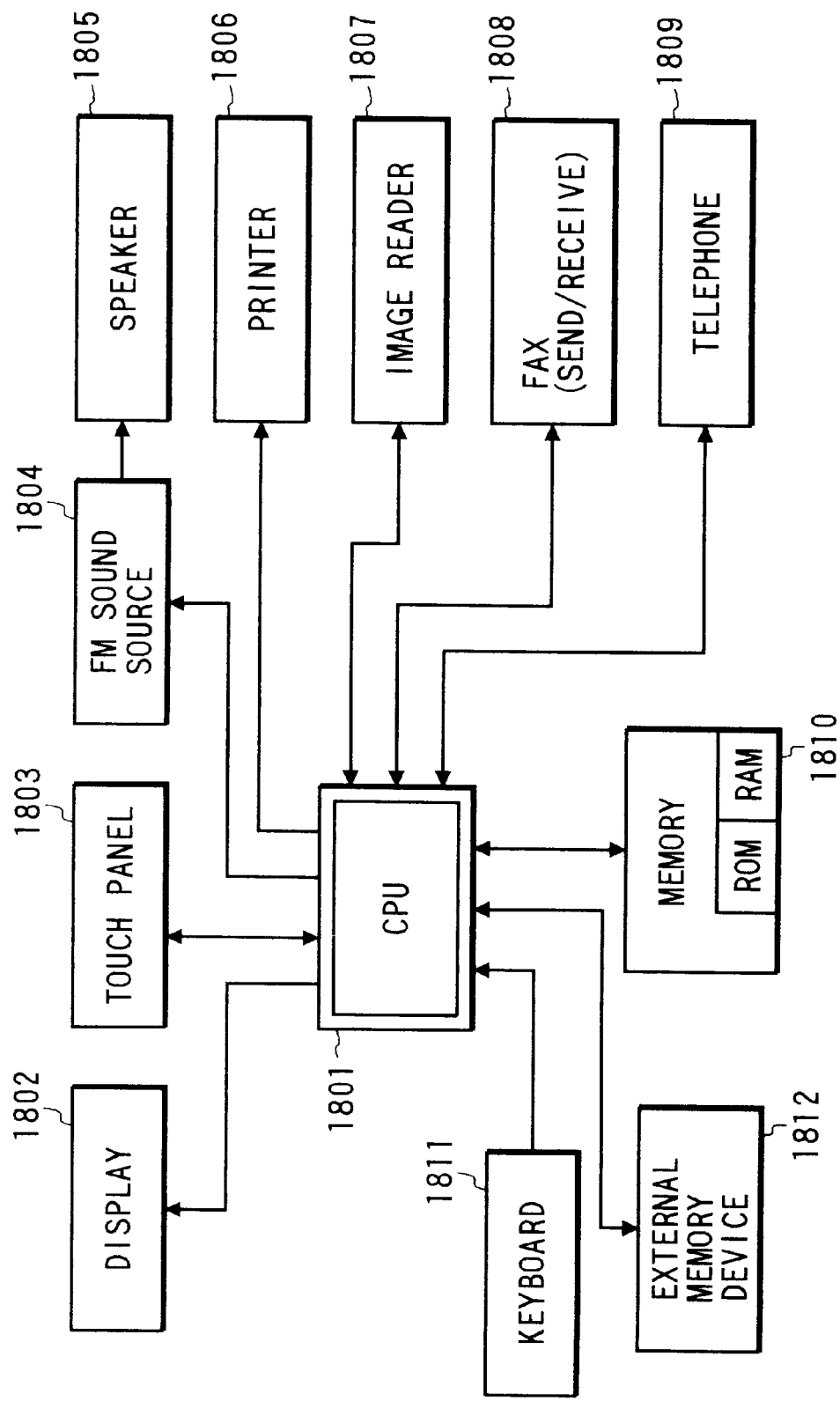
FIGS. 5 to 7 are views showing information processing apparatus in which the liquid crystal display panel is used.
Figure 6:
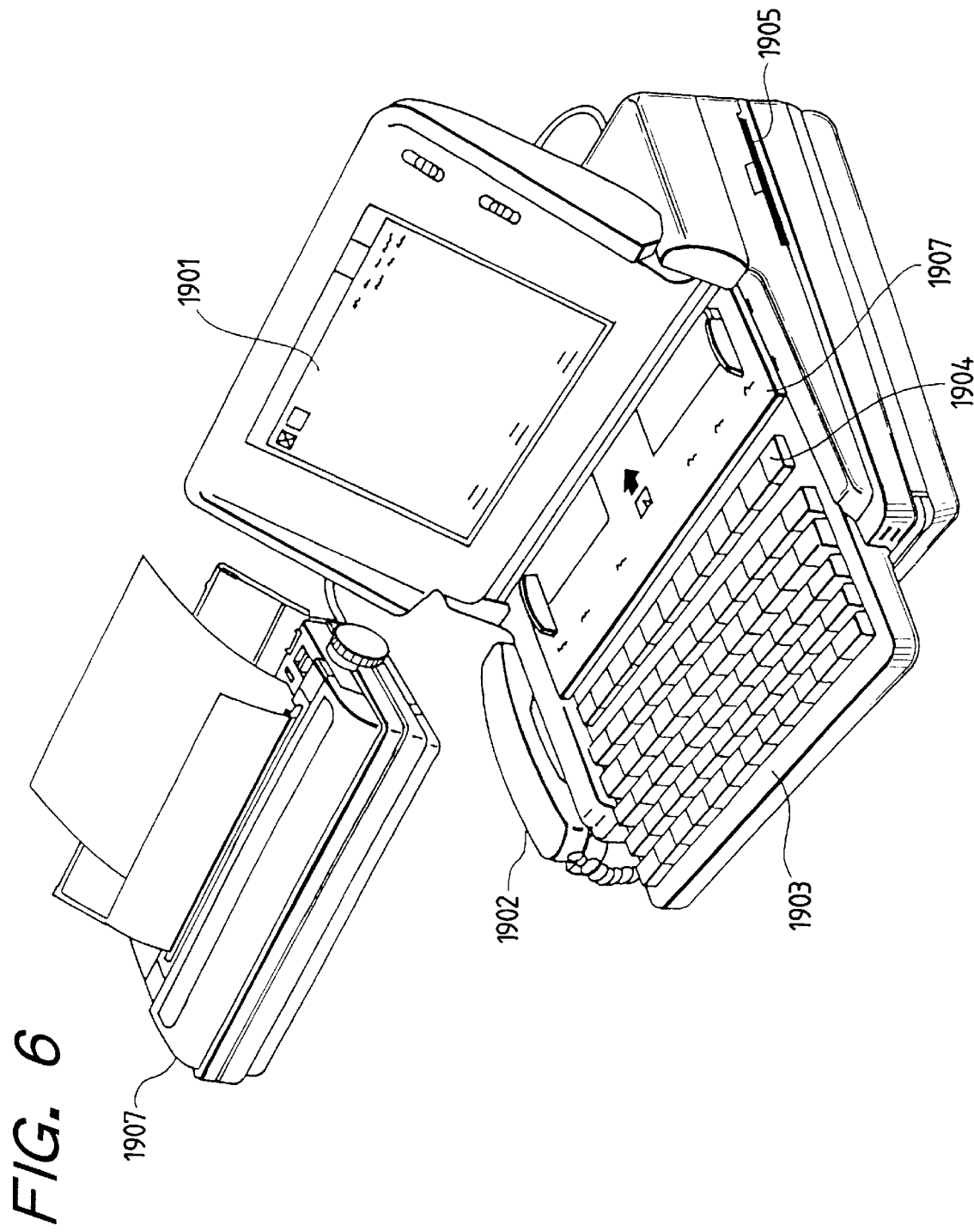
Figure 7:
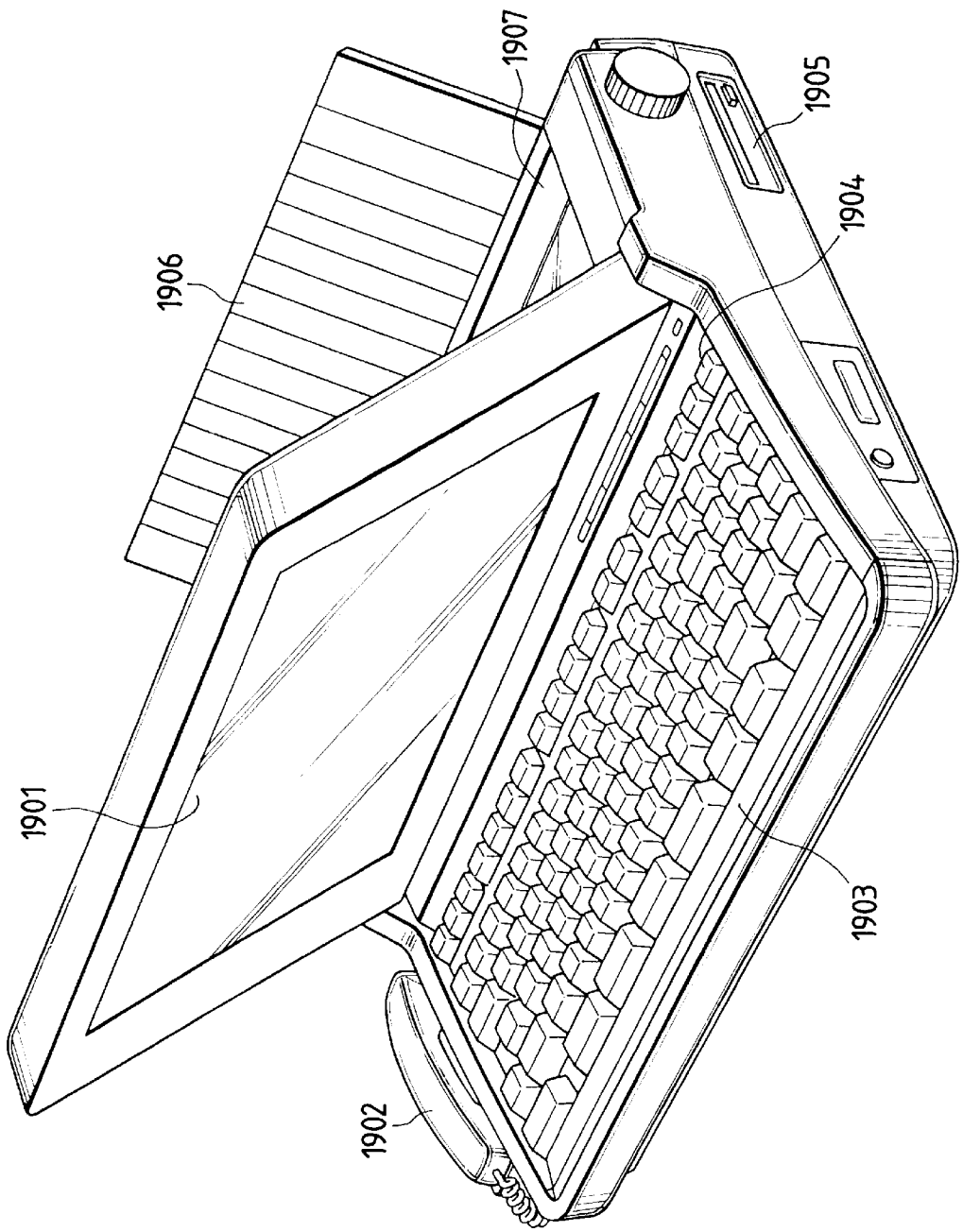

Examples of application of such liquid crystal panel in an information processing apparatus are shown in FIGS. 5 to 7.

FIG. 5 is a schematic block diagram when the above-mentioned liquid crystal panel is applied to an information processing apparatus having the functions as a word processor, a personal computer, a facsimile apparatus and a copying apparatus.

In FIG. 5, a control unit 1801 for controlling the entire apparatus is provided with a CPU such as a microprocessor and various I/O ports and effects control by sending and receiving control signals and data signals to and from various units. A display unit 1802 displays various menus and document information, and image data read by an image reader 1807. A transparent touch panel 1803, provided on the display unit 1802, is used for entering various items or coordinates on the display unit 1802, in response to the depression of the surface with a finger.

An FM (frequency modulation) sound source 1804 stores music information, prepared for example by a music editor, etc., in the form of digital data in a memory unit 1810 or an external memory device 1812, and effects frequency modulation on such music information read from such memory. The electrical signal from the FM sound source 1804 is converted into audible sound by a speaker unit 1805. A printer unit 1806 is used as an output terminal for the word processor, personal computer, facsimile apparatus and copying apparatus.

An image reader 1807 for photoelectrically reading original data is provided in the transport path of an original paper, and is used for reading the originals for facsimile transmission or copying.

A facsimile transmission/reception unit 1808 is used for facsimile transmission of the original data read by the image reader 1807 or for receiving and decoding the transmitted facsimile signal, and has an interfacing function with the external line. A telephone unit 1809 has various telephone functions such as ordinary telephoning and message recording.

A memory unit 1810 includes a ROM storing a system program, a manager program, the other application programs, character fonts and dictionaries, a RAM for storing application programs and document information loaded from an external memory device 1812, and a video RAM.

A keyboard 1811 is used for entering text information and various commands, etc.

An external memory device 1812, utilizing a floppy disk or a hard disk, etc., is used for storing document information, music or voice information, user's application programs etc.

FIG. 6 is a schematic view of the information processing apparatus shown in FIG. 5.

A flat panel display 1901, utilizing the liquid crystal panel explained above, displays various menus, graphic information and text information. On this display 1901, there can be entered coordinates or selection of items by the depression of the surface of the touch panel 1803 with a finger, etc. A handset 1902 is used when the apparatus is functioned as a telephone. A keyboard 1903, detachably connected with the main body through a cable, is used for various document processing functions and for entry of various data. It is further provided with function keys 1904. There is also provided an insertion slot 1905 for the floppy disk for the external memory device 1812.

A sheet stacker 1906 supports the original papers to be read by the image reader 1807, and the read originals are discharged from the rear side of the apparatus. In the facsimile reception, the printing is executed by an ink jet printer 1907.

When the above-explained information processing apparatus functions as the personal computer or the word processor, the information entered from the keyboard 1811 is processed in the control unit 1801 according to the predetermined programs, and the image is outputted from the printer unit 1806.

When it is functioned as the facsimile receiver, the facsimile information received from a communication line through the facsimile transmission/reception unit 1808 is processed by the control unit 1801 according to a predetermined program, and the received image is outputted by the printer unit 1806.

When it is functioned as the copying apparatus, the original is read by the image reader 1807, and the read original data are released, through the control unit 1801, as a copied image from the printer unit 1809. When it functions as the facsimile transmitter, the original data read by the image reader 1807 are processed by the control unit 1801 according to a predetermined program and transmitted to the communication line through the facsimile transmission/reception unit 1808.

The information processing apparatus explained above may be constructed as an integral configuration, incorporating the ink jet printer as shown in FIG. 7, for achieving improved portability. In FIG. 7, components equivalent to those in FIG. 6 are represented by the same numbers.

Figure 8:
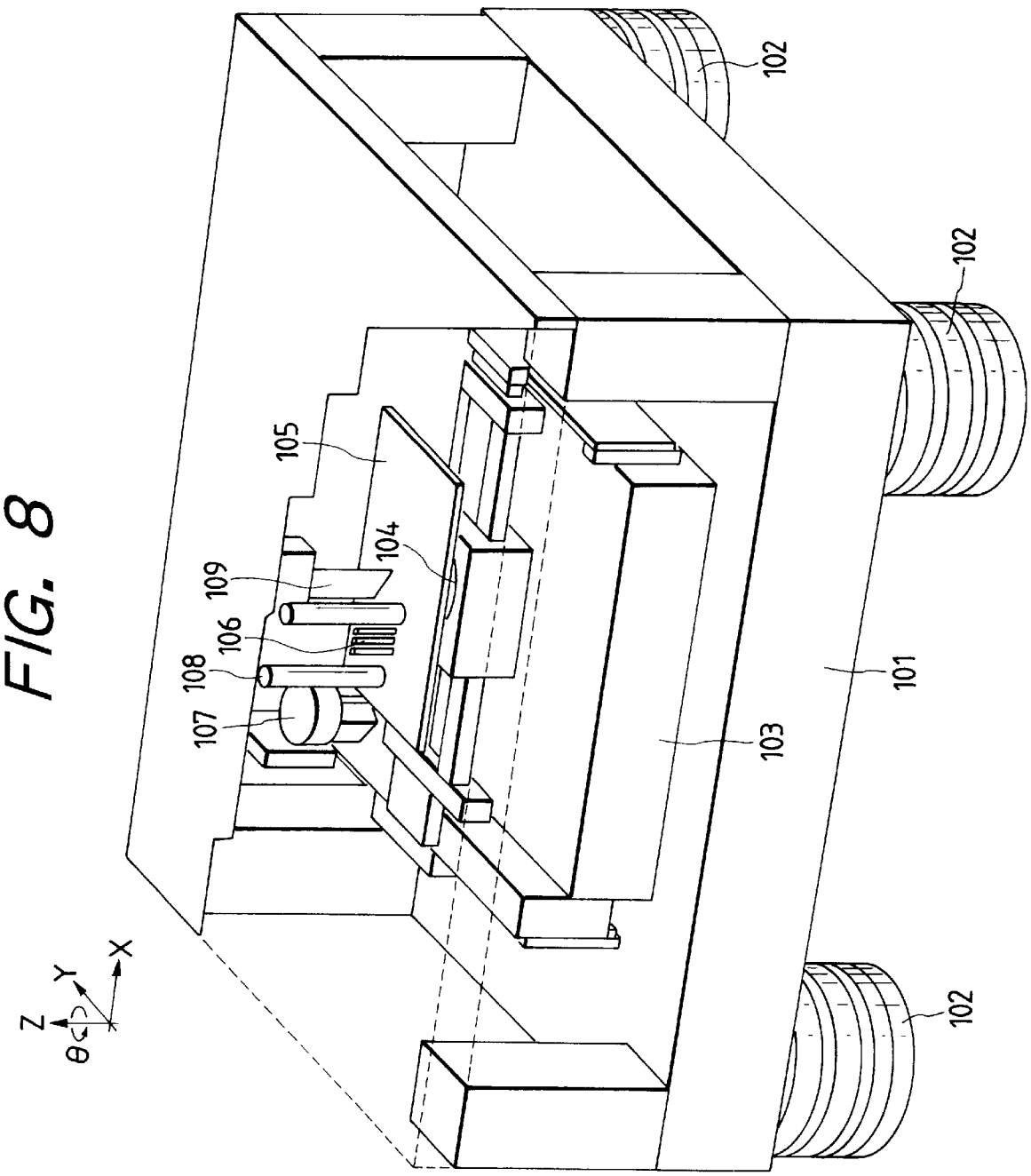
FIG. 8 is an external perspective view of an apparatus constituting an embodiment of the present invention.
Figure 9:
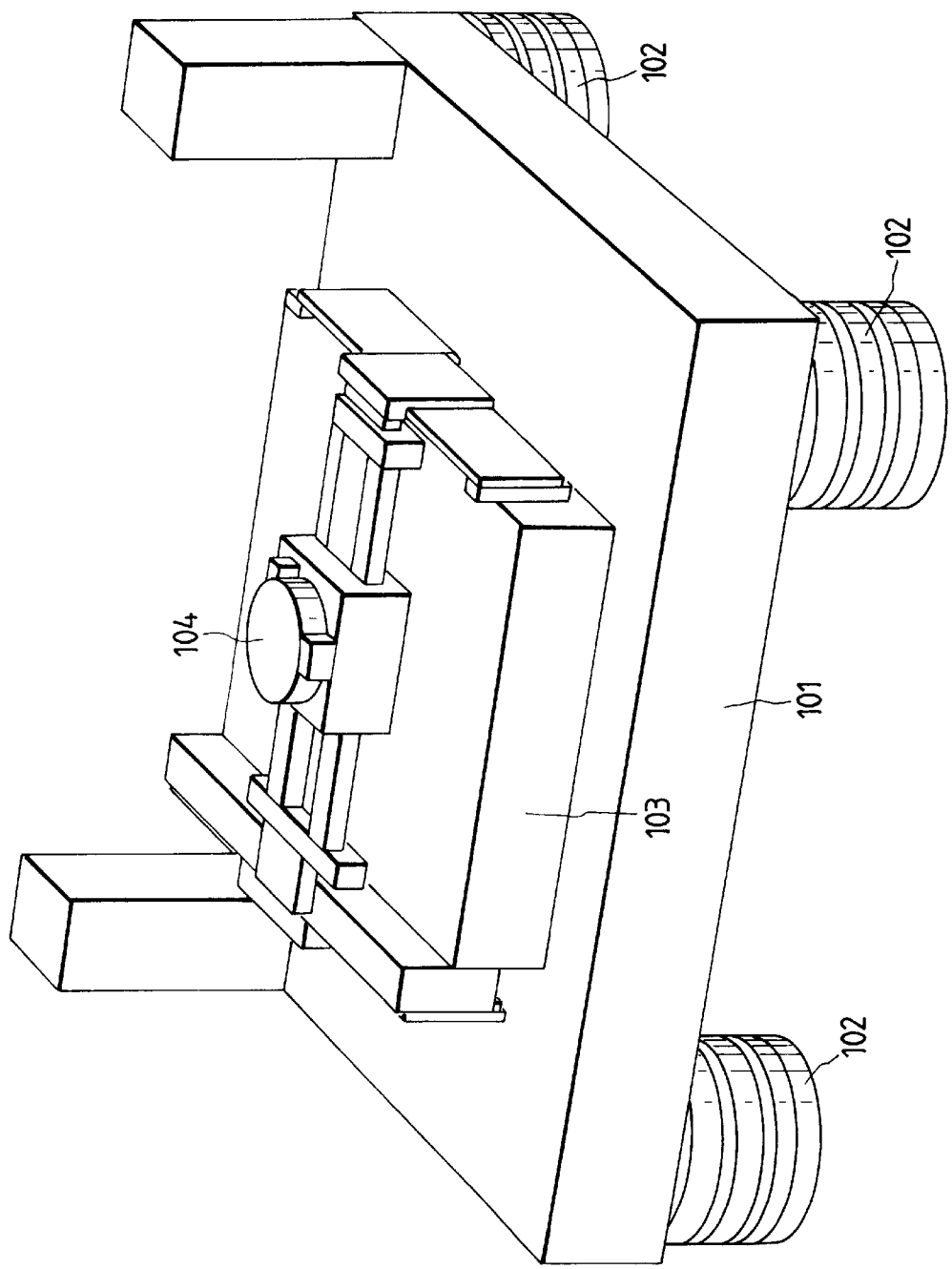
FIG. 9 is a view showing the details of a stage in the apparatus shown in FIG. 8.
Figure 10:
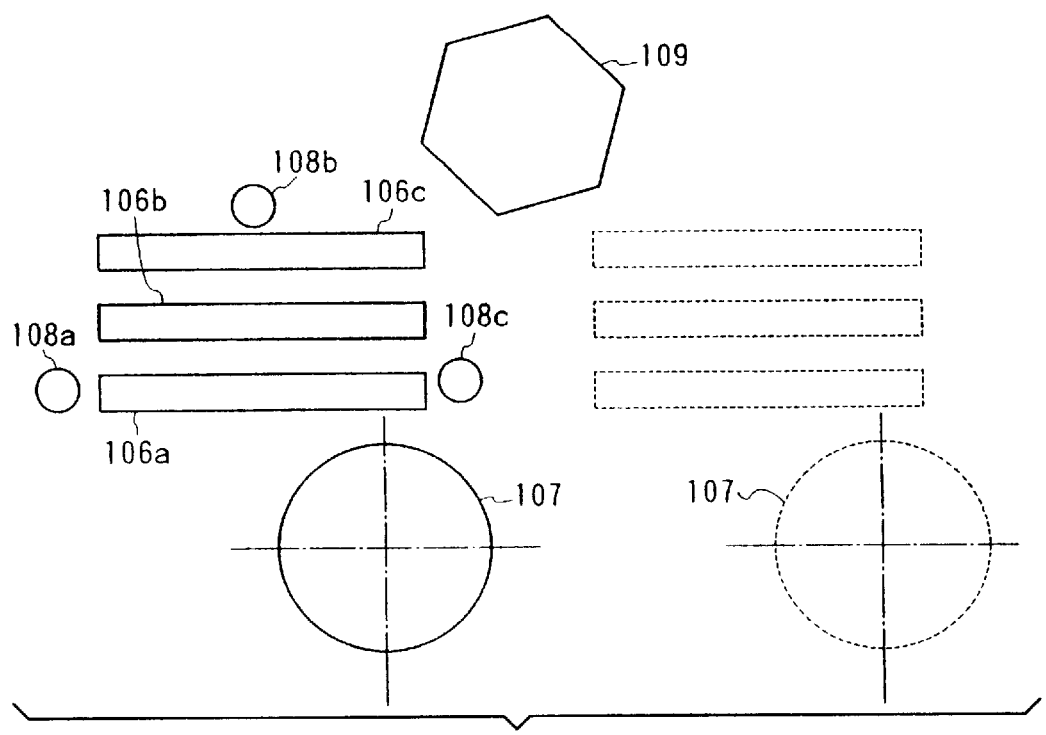
FIG. 10 is a view showing the arrangement of a head and an optical system in the apparatus shown in FIG. 8.
Figure 11:
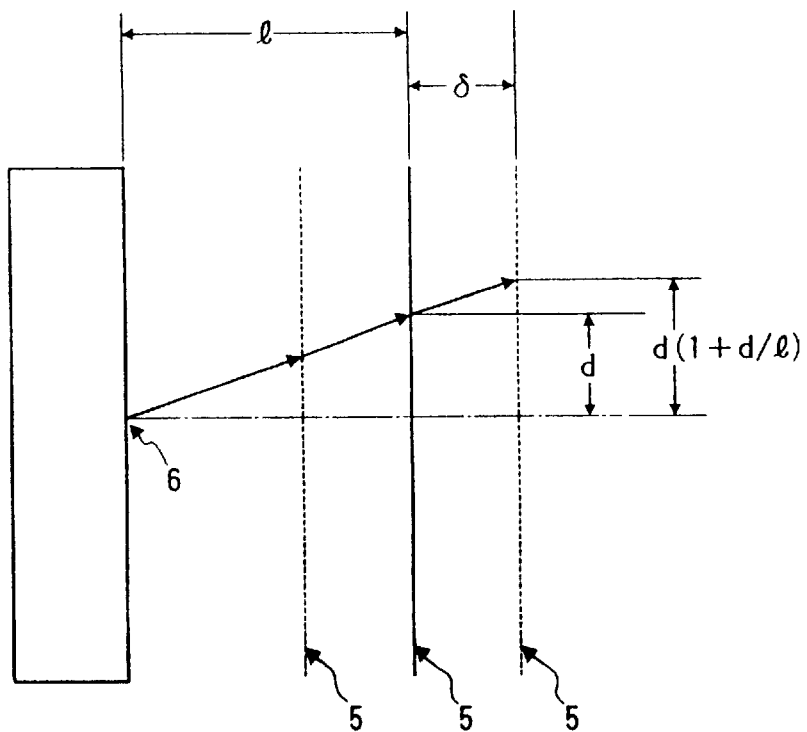
FIG. 11 is a view showing the concept of ink discharge in the apparatus shown in FIG. 8.
Figure 12:
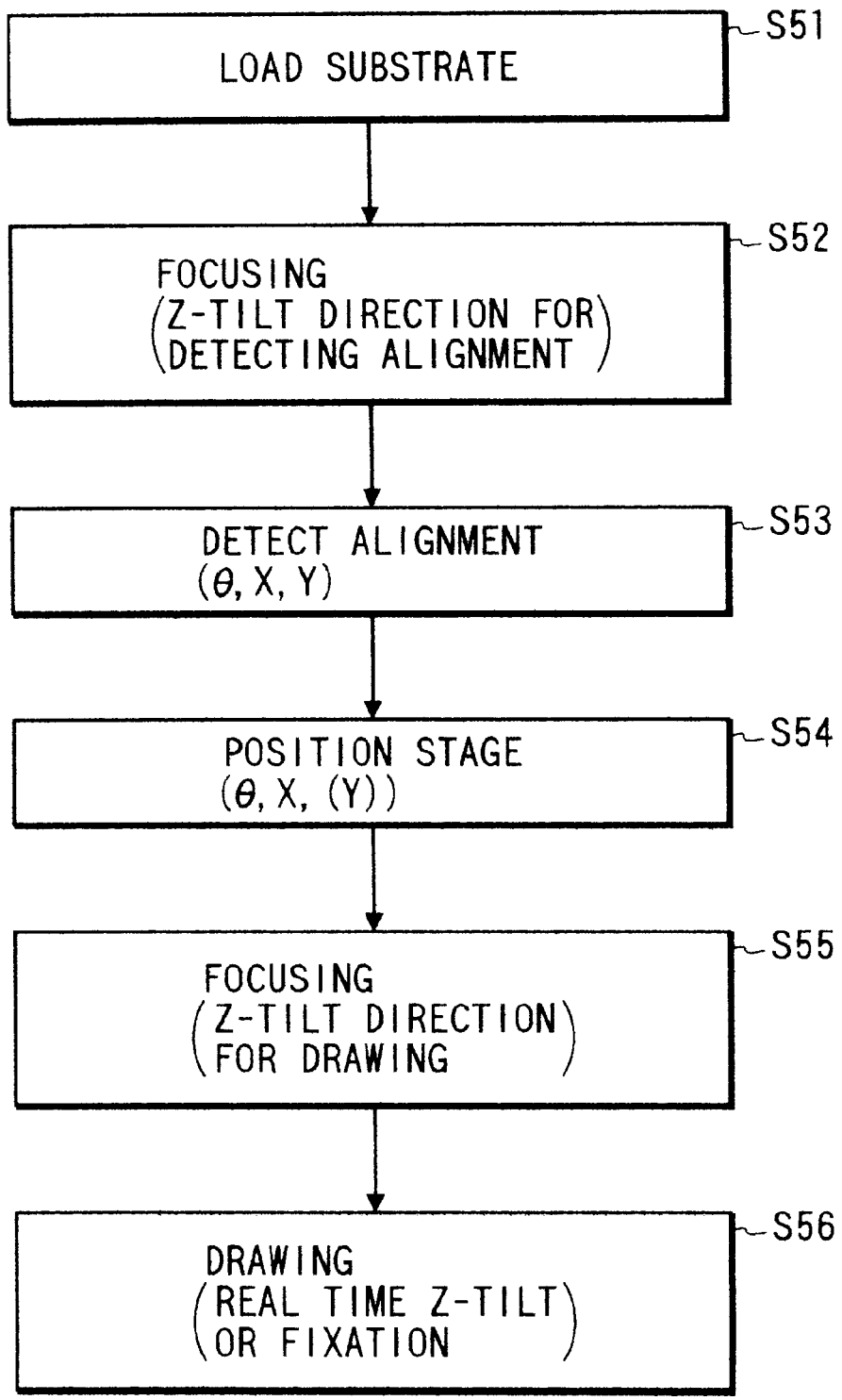
FIG. 12 is a flow chart of a drawing procedure in the apparatus shown in FIG. 8.

FIGS. 8 to 12 illustrate a color filter producing apparatus embodying the present invention, wherein FIG. 8 is an external perspective view of the apparatus, FIG. 9 is a detailed view of a stage, FIG. 10 is a view showing the arrangement of a drawing head and an optical system, FIG. 11 is a view showing the concept of ink discharge, and FIG. 12 is a schematic flow chart of the drawing procedure.

In these drawings, there are shown a base plate 101 for supporting the apparatus, vibration insulating supports 102 for intercepting the external vibration, an XY stage 103 provided on the base plate 101 for the movement of a large stroke, a θ, Z-tilt stage 104 loaded on the XY-stage 103, for θ, Z-tilt alignment, a glass substrate 105 mounted on the θ, Z-tilt stage 104, R, G, B drawing heads 106 (106a–106c), a detection optical system 107 for detecting the alignment of the base plate 101 in the X, Y and θ directions, Z-detecting optical systems 108 (108a–108c), and an optical system 109 for detecting the reaching position of the ink discharged from the drawing head 106.

In the above-explained configuration, at the assembly of the apparatus, a dummy substrate (not shown) is loaded and is aligned in the X, Y, θ-directions by the alignment detection system 107, and an evaluating pattern is drawn with the drawing heads 106a–106c. Then the XY-stage 103 is moved and the reaching position is measured by the reaching position detecting system 109. In this manner there can be accurately measured the coordinate of the alignment detection system 107 and the coordinates of the reaching positions of the drawing heads 106a–106c. Since these coordinate values remain same for other substrates, the above-mentioned measurement can only be conducted at the variation of the system parameter, for example at the assembling of the apparatus or at the replacement of the drawing heads. It is also possible to measure the reaching positions in another apparatus and to so adjust the apparatus that the measured values are reproduced on the color filter producing apparatus.

At the production of the color filter, the glass substrate 105 is loaded on the θ, Z-tilt stage 104 as shown in FIG. 12 (step S51), and alignment in the Z-tilt direction is executed by the θ, Z-tilt stage 104 in such a manner that the surface of the glass substrate 105 is contained in the detection range (depth of focus) of the alignment detection system 107 (step S52). Then displacements of the drawing heads 106a–106c are detected by the alignment detection system 107, in three directions of X, Y and θ (step S53). This detection may be conducted by detecting plural marks with plural detection systems, or by detecting plural marks with a single detection system with a stage movement. Based on the results of such detection, the displacement in the θ component is corrected by the θ, Z-tilt stage 104, while the displacement in the X direction is corrected by an adjustment of the XY-stage 103 in the X-direction. Also the displacement in the Y-direction (print scanning direction) is corrected either by an adjustment of the XY-stage 103 in the Y-direction, or by control of the discharge timing from the drawing heads 106a–106c (step S54). Also the reaching position varies, as shown in FIG. 11, if there is a variation in the gap between the glass substrate 105 and the drawing heads 106a–106c. Consequently the gap and the inclination therebetween are determined by the Z-detection systems 108a–108c, and the drawing is conducted by the drawing heads 106a–106c under such control as to maintain a constant gap (step S56). Depending on the required precision, the measurement and the correction may be made only at the loading of the glass substrate, and the gap may be maintained fixed during the drawing operation.

The present embodiment provides the following:

(1) The number of steps can be reduced in comparison with the conventional method, as the drawing operation can be made simultaneously for three colors;

(2) Dust deposition on the glass substrate 105 can be reduced since no moving parts are present above the XY-stage 103;

(3) The XY-stage 103 can be moved faster to improve the productivity, since the movement of the glass substrate 105 involves a smaller mass in comparison with the movement of the drawing heads 106a–106c and the microscope of the detection system;

(4) A highly precise drawing operation is made possible as the alignment between the glass substrate 103 and the reaching positions of the ink from the drawing heads 106a–106c in the XY plane is measured and corrected; and (5) As the gap (in Z-tilt direction) between the glass substrate 105 and the drawing heads 106a–106c is constantly adjusted, the relative displacement is maintained constant in all the directions of six degrees of freedom, whereby the reaching position can always be maintained constant even if directionality exists in the ink discharge, thereby also ensuring a highly precise drawing operation.

Figure 13:
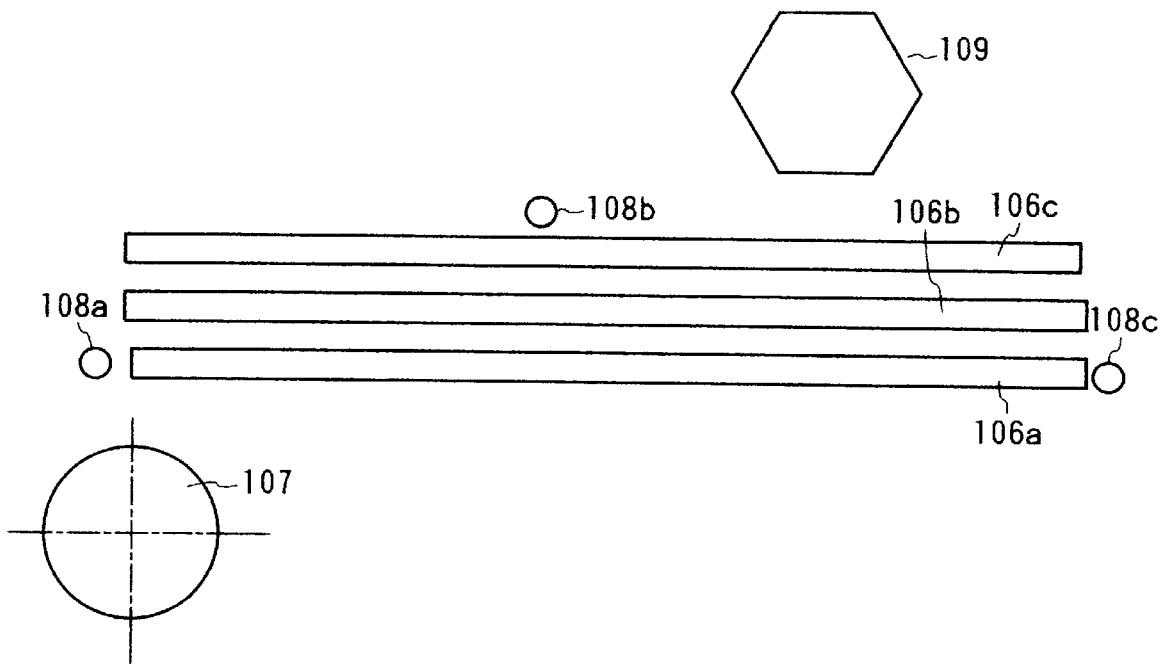
FIGS. 13 and 14 are views showing the arrangement of the head and the optical system in other embodiments of the present invention.

FIG. 13 shows the arrangement of the drawing heads 106a–106c in another embodiment of the color filter producing apparatus of the present invention, wherein components equivalent to those in the foregoing embodiment are represented by same numbers.

In this embodiment, the length of the drawing heads 106a–106c is selected same as the width of the drawing area of the substrate, thereby additionally providing the following advantages;

(1) The configuration of the apparatus can be made simple, since the stroke of the XY-stage 103 in the X-direction is only required for alignment and the stroke can therefore be made smaller; and (2) The area occupied by the apparatus can be made smaller because of the reduced stroke in the X-direction.

Figure 14:
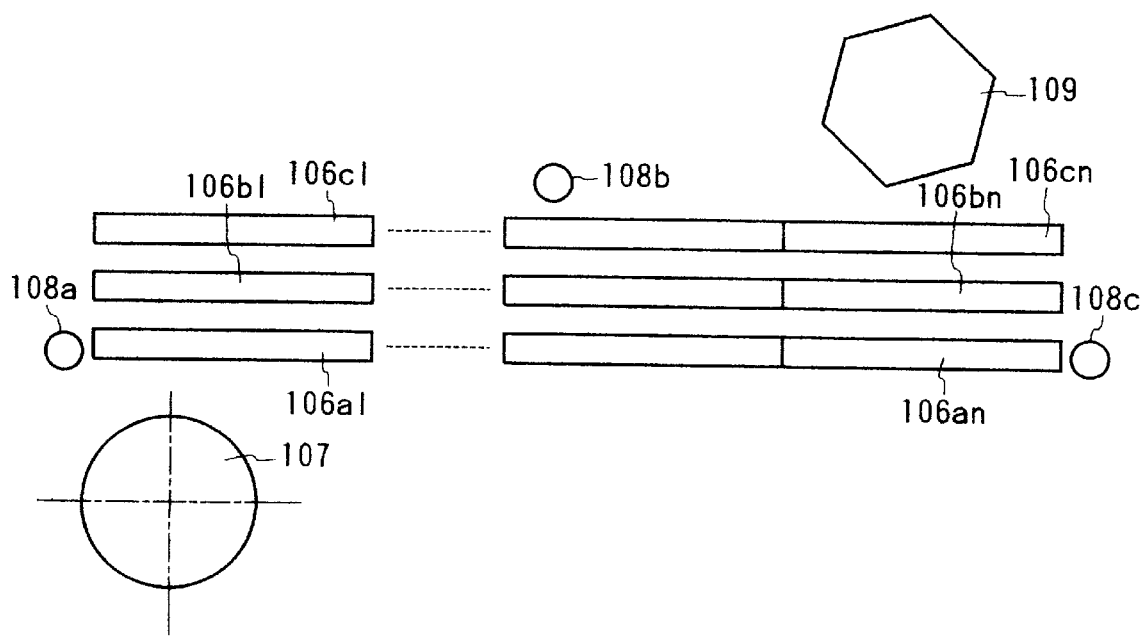

FIG. 14 shows an image of the arrangement of the drawing heads in still another embodiment of the color filter producing apparatus of the present invention, wherein components equivalent to those in the foregoing embodiment are represented by the same numbers.

In this embodiment, as plural heads (106a1–106an, 106b1–106bn, 106c1–106cn) are so arranged that the length thereof is equal to or larger than the width of the drawing area on the substrate, it can easily adapt to the change in the substrate size, in addition to the foregoing advantages.

Figure 15:
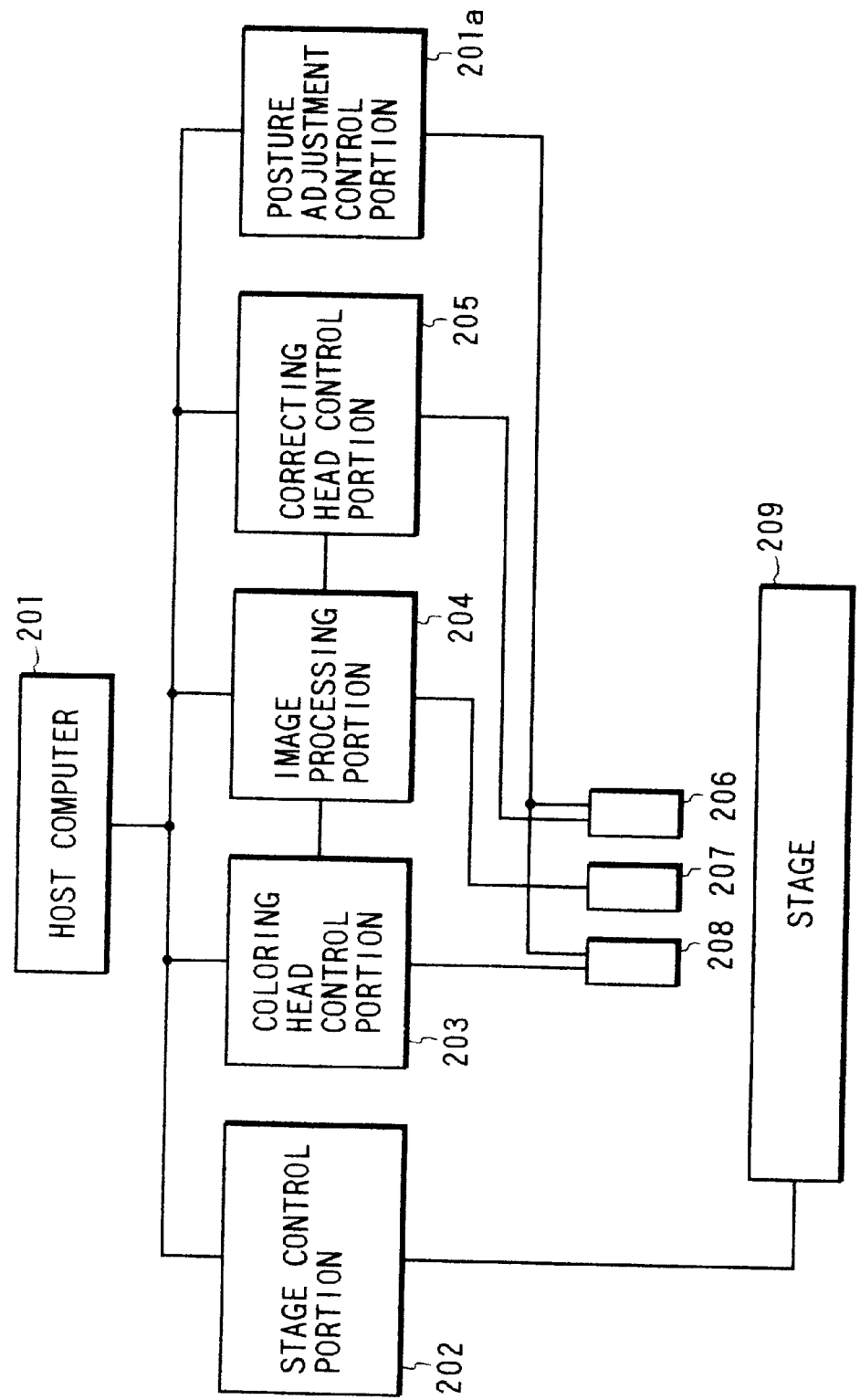
FIG. 15 is a block diagram of another embodiment of the color filter producing apparatus.

FIG. 15 is a block diagram of a color filter producing apparatus embodying the present invention.

In FIG. 15, there are shown a host computer 201 for controlling the entire apparatus; a control unit 202 for a stage 209; a control unit 203 for a coloring ink jet head 208; an image processing unit 204 for processing the image signal from a sensor 207; a control unit 205 for a correcting ink jet head 206; a sensor 207 detecting the ink discharge from the ink jet head 208; a posture adjustment control unit 201a for controlling the posture of the coloring ink jet head 208 and the correcting ink jet head 206, and a stage 209. The ink jet head 208 is used for coloring, while the ink jet head 206 is used for ink discharge for correcting, in case of an error in the coloring by the head 208. A head unit 210 is constituted by the coloring head 208, the sensor 207 and the repairing head 206.

Figure 16:
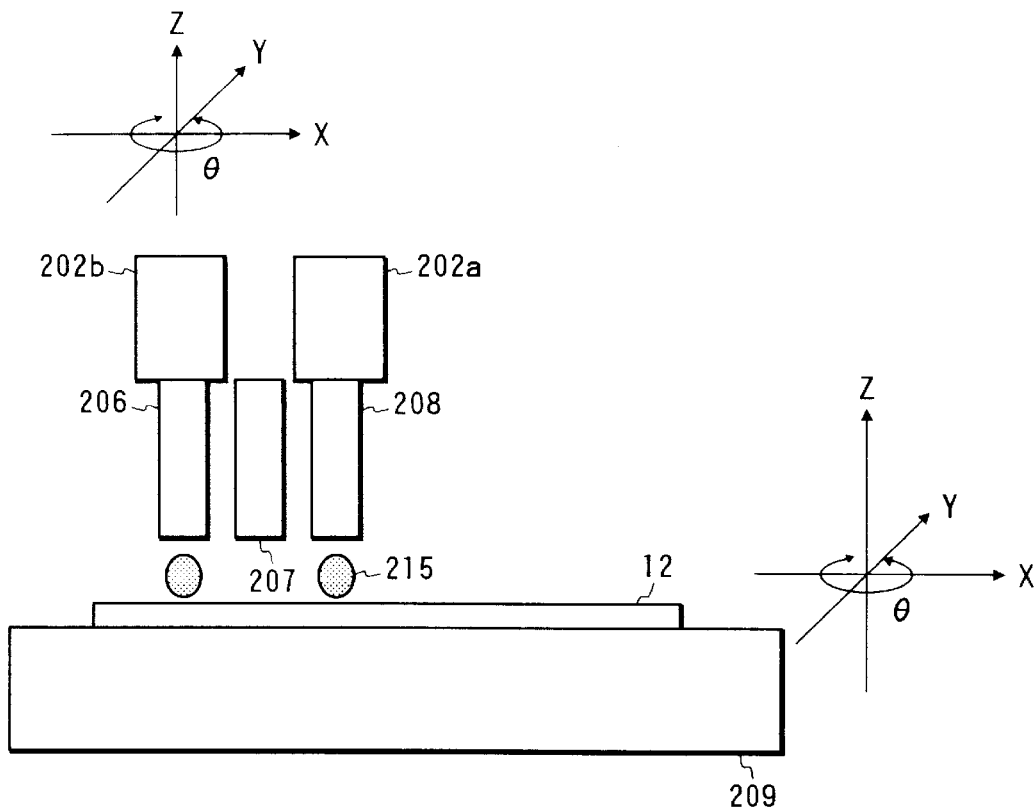
FIG. 16 is a schematic view showing the positional relationship of a coloring head, a correcting head, a sensor and a stage.

FIG. 16 is a view showing schematically the positional relationship of the coloring head 208, the repairing head 206, the sensor 207 and the stage 209. A glass substrate 12 to be colored is provided thereon, in advance, with a dyed layer 14 as explained before. The stage 209 is so constructed as to be capable of moving the substrate 12 in the X- and Y-directions and to rotate the same around the θ-direction. 215 indicates the ink discharged in the Z-direction. There are also provided posture adjustment mechanisms 202a, 202b for respectively adjusting the posture of the coloring head 208 and the repairing head 206 in the X, Y, Z and θ directions. In each mechanism, the movement in each direction is made possible for example by a combination of a linearly movable stage and a rotatable stage. The movement in each direction may be made manually or by a suitable drive source such as a motor.

The coloring head 208, the sensor 207 and the repairing head 206 are rendered movable, relative to the substrate 12, in the X- and Y-directions, by the movement of the either in these directions while the other is maintained fixed. Each of the coloring head 208 and the repairing head 206 has linearly arranged plural ink discharge apertures.

Figure 17:
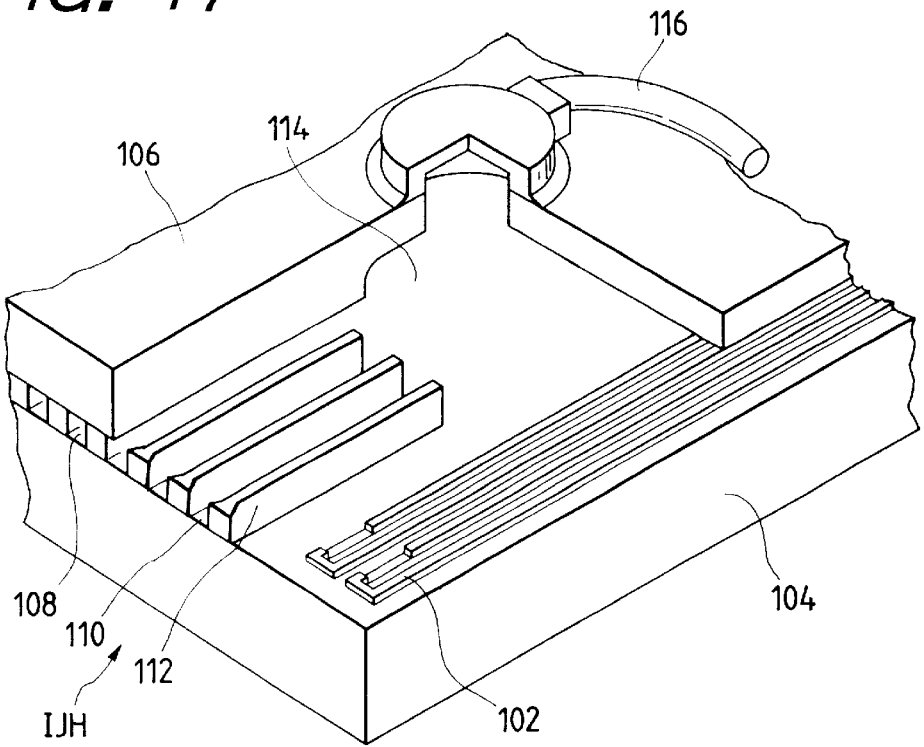
FIG. 17 is a view showing the configuration of an ink jet head IJH for discharging ink onto a layer to be dyed.

FIG. 17 shows the structure of a single-color ink jet head IJH constituting the coloring head 208 or the repairing head 206 mentioned above. The head 208 or 206 is provided with such single-color ink jet head IJH for each of red, green and blue colors, so that the coloring head 208 or the correcting head 206 is constituted by three ink jet heads IJH.

Referring to FIG. 17, the ink jet head IJH is composed of a heater board 104, consisting of a substrate bearing plural heaters 102 for ink heating, and a ceiling board 106 for covering the heater board 104. The ceiling board 106 is provided thereon with plural discharge apertures 108, behind which there are formed tunnel-shaped liquid paths 110 communicating therewith. Each liquid path 110 is separated from the neighboring ones by partitions 112. The liquid paths 110 are commonly connected, at the rear, to an ink chamber 114 which receives ink supply by way of an ink supply aperture 116 and sends the ink to the liquid paths 110.

The heater board 104 and the ceiling board 106 are mutually assembled in such a manner that the heaters 102 respectively correspond to the liquid paths 110, as shown in FIG. 17. Though FIG. 17 illustrates only two heaters 102, a heater 102 is provided for each of the liquid paths 110. By the supply of a predetermined driving pulse to the heater 102 in the assembled state shown in FIG. 17, the ink on the heater 102 boils to generate a bubble, and is discharged from the discharge aperture 108 by the expansion of the bubble. The size of the bubble can be controlled by the control of the driving pulse, for example the power thereof, applied to the heater 102, so that the volume of the ink discharged from the aperture can be arbitrarily controlled.

FIGS. 18A and 18B show the positional relationship between the coloring or correcting head and a translucent area (filter element) formed on the glass substrate 12 to be colored, respectively in case the distance of the ink discharge apertures for coloring is same as or different from the distance of the translucent areas formed on the glass substrate 12. In FIG. 18A, there are shown the coloring head 208, an ink discharge aperture 217, a filter element (optically translucent area) 10a formed on the substrate 12, and an ink dot 219 that has been discharged from the aperture 217 and has reached. In this case, since the pitch L of the ink discharge apertures 217 is same as the pitch W1 of the filter elements 10a, the glass substrate 12 and the coloring head 208 have a zero rotational relationship as illustrated. On the other hand, if the pitch L of the ink discharge apertures 217 is different from the pitch W2 of the filter elements 10a as shown in FIG. 18B, the coloring head 208 can be adjusted to an angle θ represented by:

$$W2/L = \cos\theta$$

relative to the glass substrate 12, and the coloring operation is made possible for any pitch of the filter elements 10a on the substrate 12.

In the following there will be explained the coloring method when the coloring head and the glass substrate are set in a predetermined angular relationship.

Figure 19A:
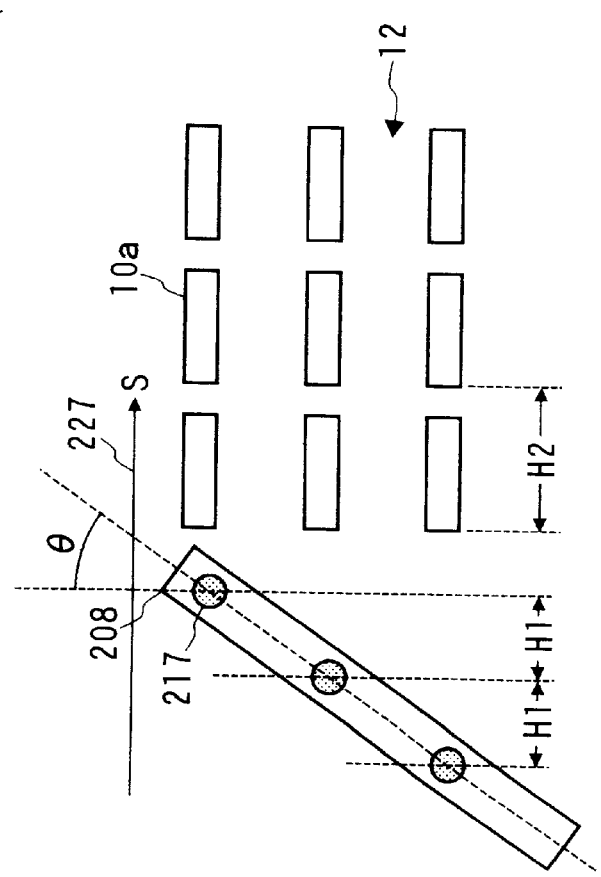
FIGS. 19A and 19B are views showing the coloring method when the coloring head is inclined with a predetermined angle.
Figure 19B:
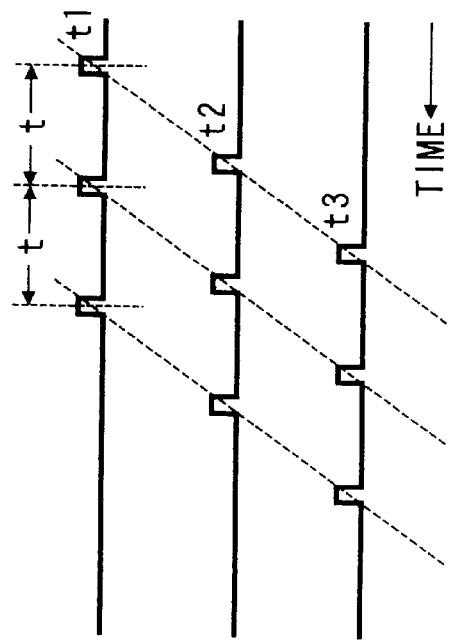

In FIG. 19A, the coloring head 208 and the glass substrate 12 are set with a mutual angle θ, and it is assumed that they mutually move in a direction 227 with a relative speed S. In this state, the plural ink discharge apertures for coloring have a pitch H1 in the horizontal direction, while the filter elements 10a has a pitch H2 in the direction 227 of relative movement. FIG. 19B shows the discharge timing of the ink discharge apertures. The ink discharge is started at timings t1, t2 and t3 respectively for the first, second and third discharge apertures. The relationship among t1, t2, t3 is determined by the relative speed S and the horizontal pitch H1 of the discharge apertures by:

$$(t2-t1) = H1/S$$

$$(t3-t2) = H1/S.$$

Also the pitch t of the discharges of a discharge aperture for the filter elements 10a adjacent in the direction of relative movement is determined by:

$$t = H2/S.$$

Thus, there can be produced a color filter with an arbitrary pitch of the filter elements 10a, without requiring a coloring head with a particular pitch of the ink discharge apertures, through the control of the ink discharge timing. Although the foregoing description has been made on a single coloring head, a similar process is evidently realizable with plural heads.

Figure 20B:
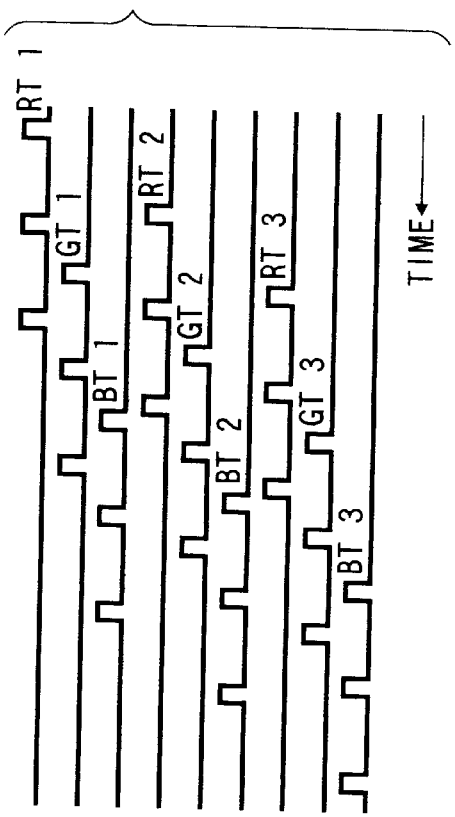
FIGS. 20A and 20B are views showing the coloring method when plural coloring head is inclined by a predetermined angle.
Figure 20A:
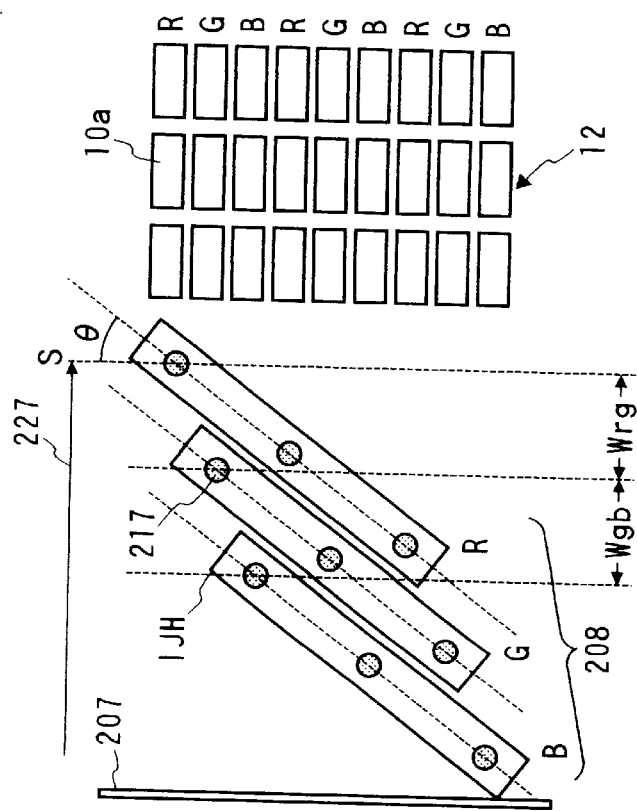

In the following there will be explained a case of employing plural coloring heads. FIGS. 20A and 20B shows a case of employing plural coloring heads respectively for red, green and blue colors.

In FIG. 20A, a coloring head 208 is composed of plural ink jet heads IJH for discharging red, green and blue inks. Ink discharge apertures 217 are so positioned as to deposit the R, G, B inks in repeated cycles in a direction perpendicular to the direction 227 of relative movement, thereby forming filter elements 10a of a same color in the above-mentioned direction 227. The coloring head 208 and the glass substrate 12 are mutually set by an angle θ, and it is assumed that they mutually move in a direction 227 by a relative speed S. In this state, the plural ink discharge apertures in the coloring head 208 have horizontal pitches Wrg, Wgb. A sensor 207, composed of an image pickup device such as a line sensor, is positioned behind the plural ink jet heads IJH. FIG. 20B shows the timing of discharges from the ink discharge apertures. The R coloring head starts ink discharge at timings RT1, RT2, RT3 respectively for the first, second and third apertures. The G coloring head starts ink discharge at timings GT1, GT2, GT3 respectively for the first, second and third apertures.

The B coloring head starts ink discharge at timings BT1, BT2, BT3 respectively for the first, second and third apertures. The relationship among RT1, GT1 and BT1 is determined, according to the relative speed S and the horizontal pitches Wrg, Wgb of the ink discharge apertures of the R, G, B coloring heads by:

$$(GT1-RT1)=Wrg/S$$

$$(BT1-GT1)=Wgb/S.$$

The discharge timings of an ink discharge aperture for the filter elements formed in the direction of relative movement are same as already explained in relation to FIG. 19B. Also those of the ink discharge apertures contained in a same ink jet head are same as already explained in relation to FIG. 19B. In the foregoing description, the plural ink jet heads are composed of red, green and blue coloring heads, thus such three colors are not limitative. For example, the plural coloring heads may be for a same color.

In the following there will be explained an adjusting method for adjusting the pitch of the ink discharge apertures of the plural coloring heads same as that of the optically translucent areas.

Figure 21:
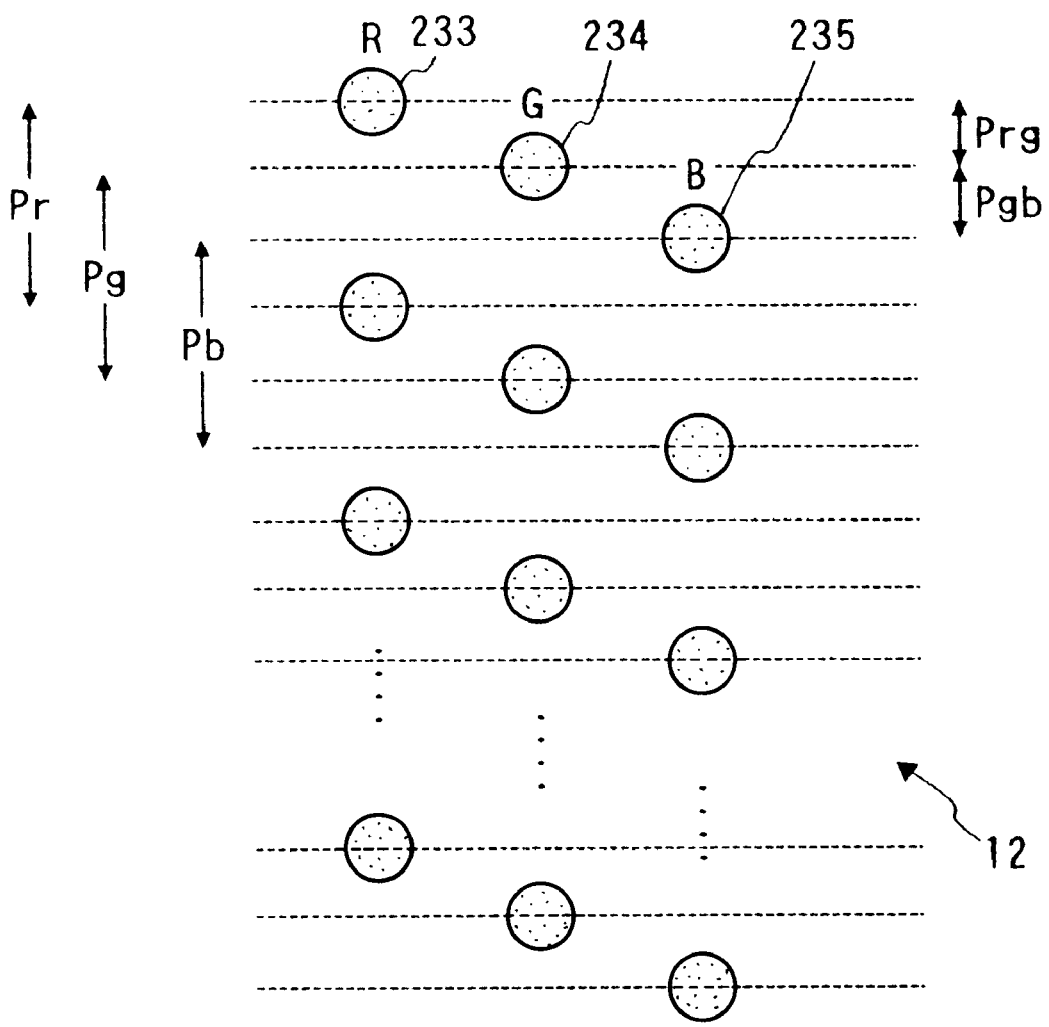
FIG. 21 is a view showing an example of the colored pattern formed for adjustment.

FIG. 21 shows an example of the test pattern of the coloring materials for adjustment:, in case of employing R, G and B ink jet heads. There are shown dots 233, 234, 235 formed on the glass substrate 12 respectively by the R, G and B ink jet heads, wherein the dots aligned in the vertical direction are those of a same color, formed by the ink discharge apertures in a same ink jet head. There are also shown a R ink dot pitch; Pr, a G ink dot pitch; Pg, a B ink dot pitch; Pb, a pitch Prg between the R and G ink dots, and a pitch Pgb between the G and B ink dots. These pitches are measured, and the ink jet heads are so adjusted that these pitches become equal to the pitches of the filter elements 10a.

Figure 22:
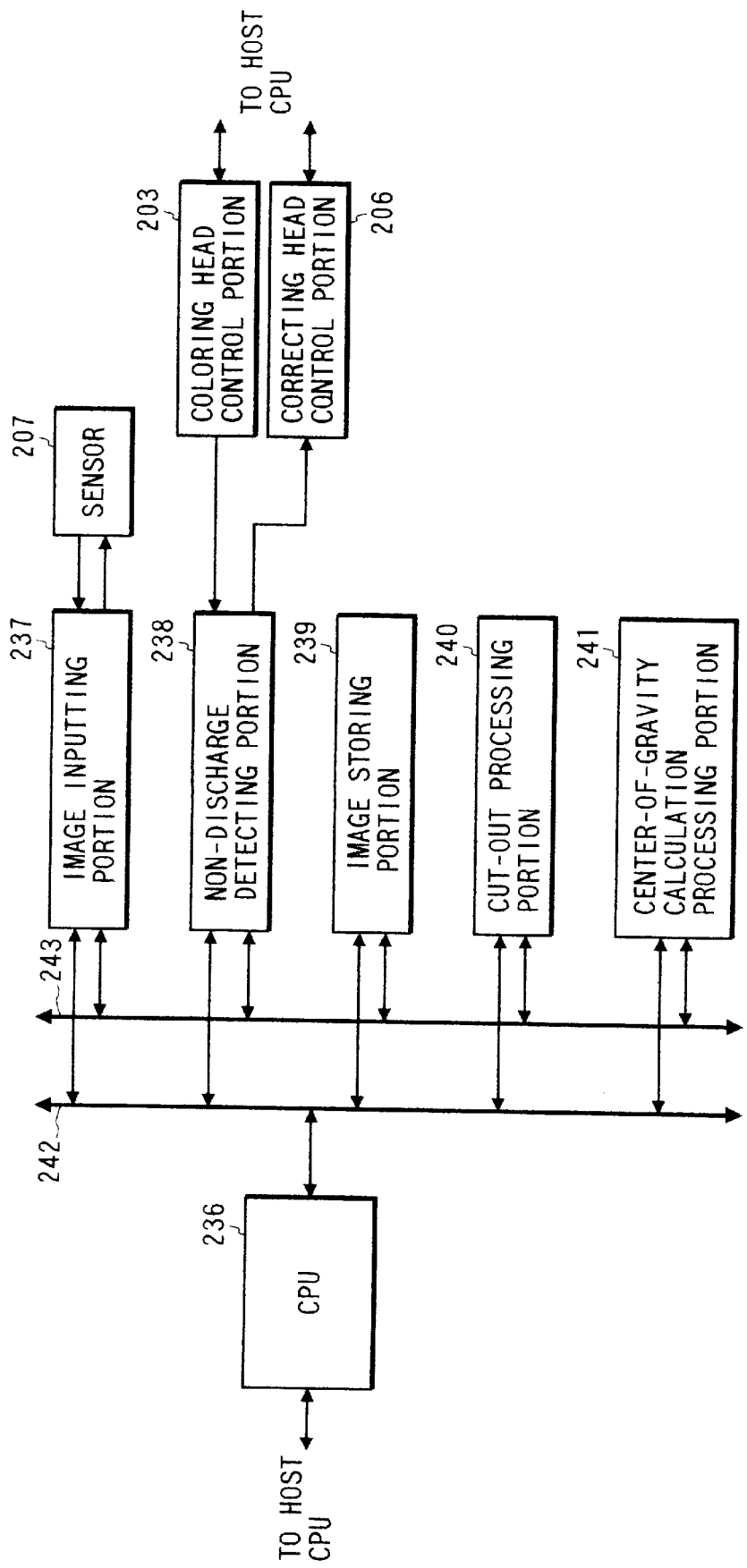
FIG. 22 is a block diagram showing an example of the image processing unit for measuring the ink dot reaching position.
Figure 23:
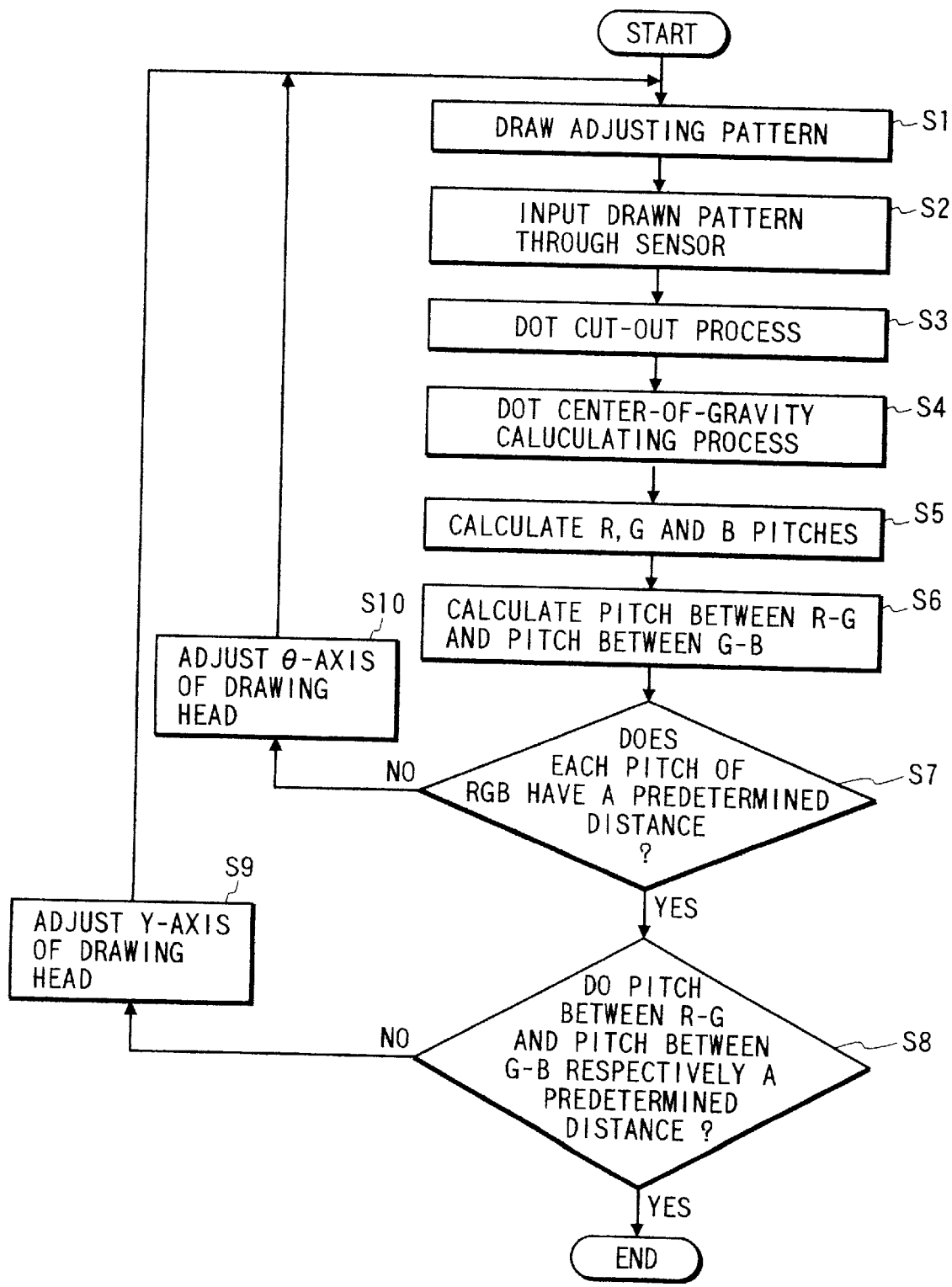
FIG. 23 is a flow chart for explaining an adjustment procedure.

FIG. 22 is a block diagram of an image processing unit for measuring the reaching positions of the dots by means of a pattern as shown in FIG. 21, and FIG. 23 is a flow chart of the adjusting procedure.

In FIG. 22 there are shown a CPU 236 for controlling the image processing unit, connected with the host CPU; a sensor 207 composed for example of a line sensor, for capturing the reached dots as image data; an image input unit 237 for effecting A/D conversion and corrections, for example for the unevenness in the sensitivity of the line sensor and in the illumination intensity of an unrepresented illuminating system, on the image data obtained by the sensor 207; a non-discharge detecting unit 238 for detecting whether the ink discharge has been made by the ink jet heads; an image memory unit 239 for storing the image data from the image input unit 237; a cut-out process unit 240 for individually separating and identifying the formed dots; and a center-of-gravity calculation unit 241 for calculating the position of the center of gravity of individually separated dot. The image input unit 237, the non-discharge detection unit 238, the image memory unit 239, the cutout process unit 240 and the center-of-gravity calculation unit 241 are mutually connected by a system bus 242 and a local bus 243. The non-discharge detection unit 238 is connected to a coloring head control unit 203 and a repairing head control unit 205. The sensor 207 is positioned immediately after the coloring head 238, as shown in FIG. 20A, for reading the reached dots of the test pattern shown in FIG. 21, immediately after the formation thereof, but it may also be provided in another position. In such case, after the formation of the test pattern shown in FIG. 21, the formed pattern can be read by moving the stage 209 again with a constant speed.

Now reference is made to a flow chart in FIG. 23, for explaining the procedure of detecting the reached position and adjusting the ink jet head, based on thus detected position. At first a step S1 forms a test pattern as shown in FIG. 21, and a step S2 reads the test pattern by the sensor 207 positioned immediately behind the coloring head 208. In a step S3, the cutout process unit 240 separately discriminates the reached dots, which are stored in the image memory 239. In a step S4, the center-of-gravity calculation unit 41 calculates the position of the center of gravity of each dot, separated in the step S3. A step S5 determines Pr of R pitch, Pg of G pitch and Pb of B pitch shown in FIG. 21, from the centers of gravity of the dots determined in the step S4. Then a step S6 calculates the pitch Prg between the R and G ink dots and the pitch Pgb between the G and B ink dots, shown in FIG. 21. Then a step S7 discriminates whether the pitches Pr, Pg, Pb determined in the step S5 are equal to the pitches of the R, G, B filter elements 10a formed on the glass substrate 12. If not equal, a step S10 adjusts the θ-movement mechanism of the coloring head 208 shown in FIG. 16, and the steps S1 to S7 are executed again. If equal, a step S8 discriminates whether the pitch Prg of the R and G ink dots and the pitch Pgb of the G and B ink dots, determined in the step S6 are respectively equal to the R-G pitch and the G-B pitch of the filter elements 10a, and, if not equal, a step S9 adjusts the Y-movement mechanism of the coloring head 208 shown in FIG. 16 and the steps S1 to S7 are executed again. If equal, the adjusting procedure is completed, and the coloring operation is thus enabled.

In the following there will be explained a method of controlling the discharge timing of each ink discharge aperture, in case the plural ink discharge apertures in a same ink jet head have displacements in the landing positions thereof.

Figure 24:
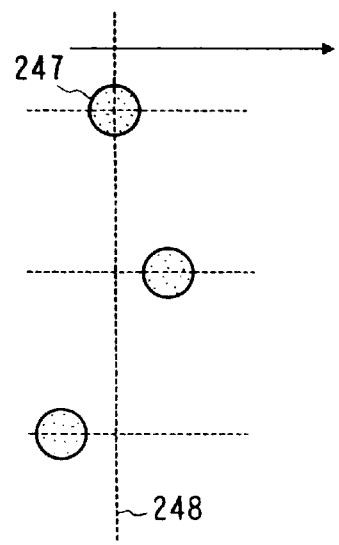
FIG. 24 is a view showing scattered displacement of the reached dots.

FIG. 24 illustrates such displacements in the reached dot positions, encountered for example in case the discharge apertures of the ink jet head is not scatteringly formed. There are shown reached dots 247, and a line 248 indicating the approximation of thus formed plural dots. The arrow in FIG. 24 indicates the direction of coloring operation. If the approximate line 248 is assumed to indicate the ideal landing position, the first dot in FIG. 24 has reached in the proper position, while the second dot has reached in front, in the direction of coloring operation, of the ideal position, and the third dot has reached behind the ideal position. With such ink jet head, there can only be obtained a defective color filter, since the ink cannot be accommodated within the corresponding filter element 10a constituting the color filter.

FIG. 25A shows the positional relationship between the ink jet head IJH involving such displaced discharge apertures and the filter elements 10a, and FIG. 25B shows the discharge timings of the ink discharge apertures corresponding to the case of FIG. 25A.

In FIG. 25A, 227 indicates the direction of relative movement of the glass substrate 12 and the ink jet head IJH in the coloring operation.

In FIG. 25B, t1 indicates the discharge timing of the first discharge aperture, while t2 and t3 are the original discharge timings of the second and third discharge apertures. If the apertures in the ink jet head involve scattering displacements as shown in FIG. 25A, the filter elements 10a cannot be precisely colored with such original timings t1, t2, t3. Consequently the discharge timing of each aperture is displaced earlier or later, according to the reaching position. As the first aperture in FIG. 25A is on the reference position, the discharge timing t1 need not be altered. As the second aperture is positioned in front of the reference position, the timing is delayed by $\Delta t2$ from t2, and, as the third aperture is positioned behind the reference position, the timing is advanced by $\Delta t3$ from t3. The filter elements 10a can be precisely colored by such control of the discharge timing of each ink discharge aperture, according to the reaching position thereof.

Figures 27A, 27B:
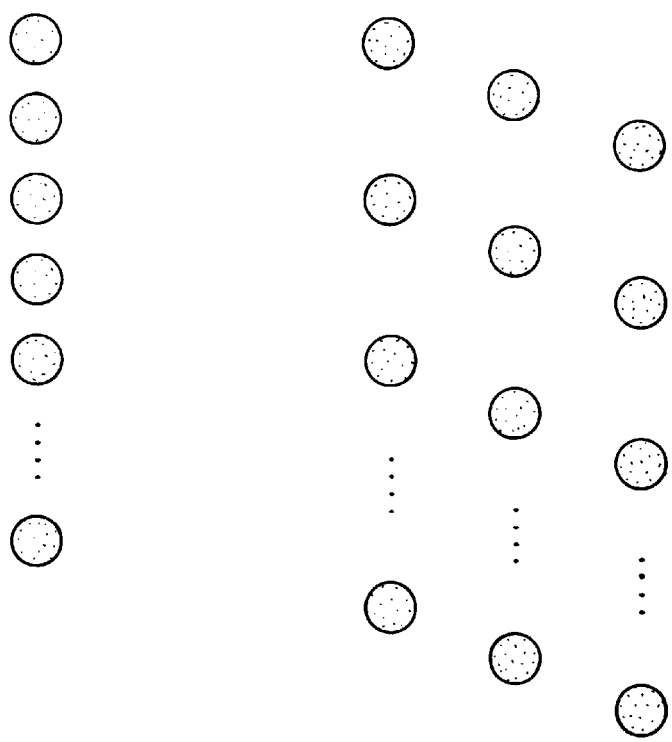
FIGS. 27A and 27B are views showing an example of the colored pattern to be used in checking the reaching positions from the ink discharge nozzles of the coloring head.

FIGS. 27A and 27B show examples of a color pattern used in checking the reaching positions of the ink discharge apertures of the coloring head. The pattern may be made either in a vertical column as shown in FIG. 27A by ink discharge from the apertures used for only coloring, among the plural discharge apertures in the coloring head, or by a certain pitch in the coloring direction, as shown in FIG. 27B, by ink discharge from all the discharge apertures in the coloring head. In the following there will be explained, with reference to FIG. 26, a procedure of determining the reaching positions from such pattern and determining the timings of ink discharge.

Figure 26:
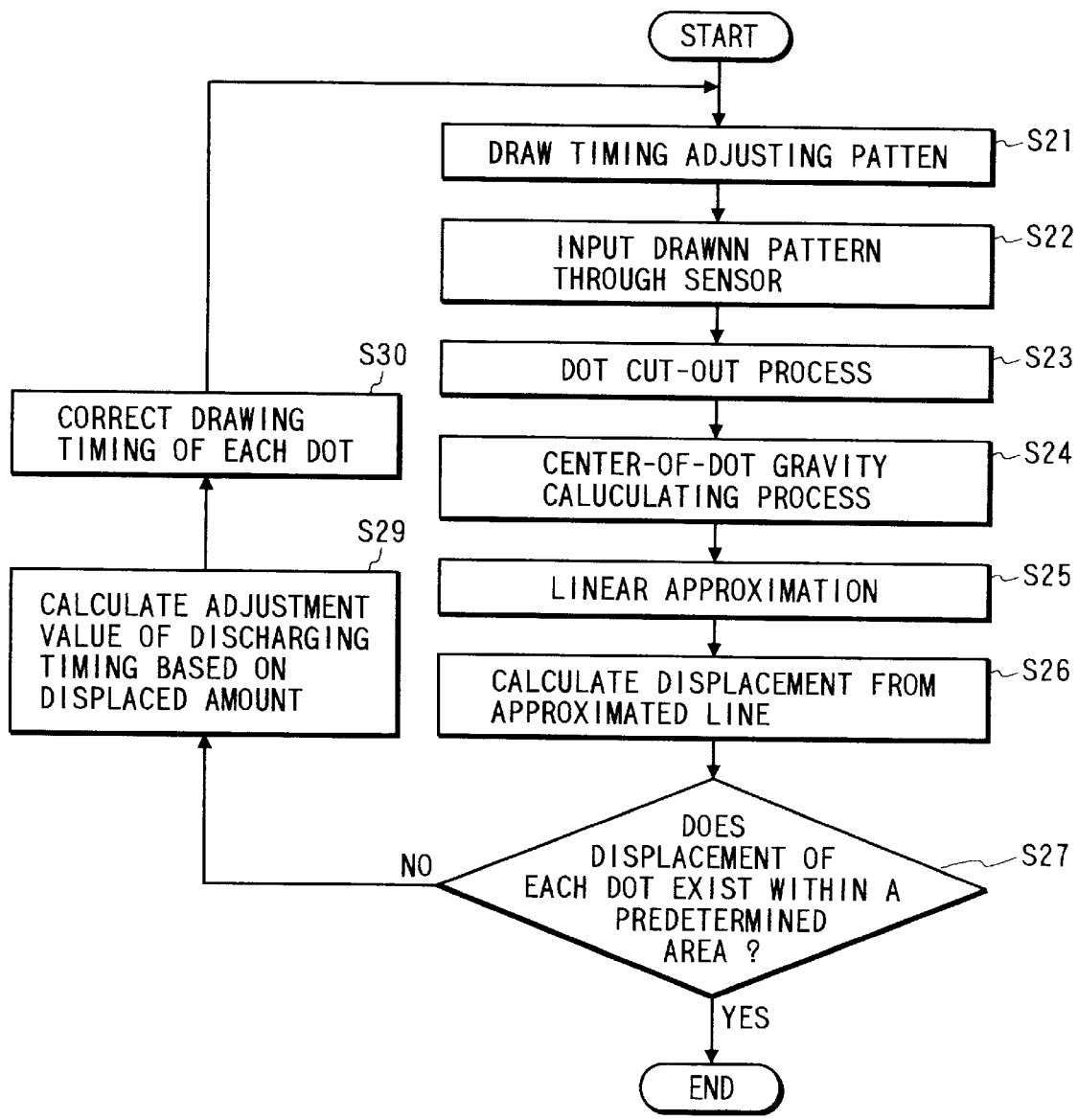
FIG. 26 is a flow chart of a procedure for detecting the reaching position and controlling the discharge timing.

FIG. 26 is a flow chart showing a procedure of detecting the reaching position and controlling the discharge timing. At first a step S21 forms a test pattern as shown in FIG. 27A or 27B, and a step S22 reads the test pattern by the sensor 207 positioned immediately behind the coloring head. In a step S23, the cut out process unit 240 separately discriminates each of the reached dots, which are stored in the image storing portion 239. In a step S24, the center-of-gravity calculation unit 241 calculates the position of the center of gravity of each dot, separately discriminated in the step S23. Based on the position of the center of gravity of each dot calculated in the step S24, a step S25 effects linear approximation either for all the dots in case of the pattern shown in FIG. 27A or for each vertical column in case of the pattern shown in FIG. 27B. After the determination of such approximation line, a step S26 calculates the amount of displacement of the center of gravity of each dot from the approximation line, and a step S27 discriminates whether the amount of displacement of each dot is within a predetermined range. If not, the discharge timing has to be adjusted, and a step S29 calculates the adjustment value for the discharge timing, based on the amount of displacement for each dot. The calculated value is set in the coloring head control unit 203 through the host CPU 201, then a step S30 corrects the discharge timing of each discharge aperture, and thereafter operations the steps S21 to S27 are executed again. If the step S27 identifies that the amount of displacement of each dot is within the predetermined range, it is judged the adjustment of the discharge timing is no longer necessary, so that the adjusting operation is completed.

The above-explained adjustment of the discharge timing based on the ink reaching position is naturally applicable also to the case of utilizing plural ink jet heads. More specifically, in such case, there can be prepared a pattern as shown in FIG. 27A or 27B for the ink jet head of each color and executed the operation as shown in FIG. 26.

As explained in the foregoing, the present embodiment enables production of a precise color filter even in case where the ink reaching positions from the plural ink discharge apertures involve are scattering displaced. It is thus rendered possible to produce a color filter of higher quality, suppressing the fluctuation of the precision generating by each time of the replacement of the ink jet head and stabilizing the obtained quality.

The present invention is not limited to the foregoing embodiments but is subject to various modifications and alterations, within the scope and spirit of the appended claims.

Among various ink jet recording methods, the present invention brings about a particular effect when applied to the recording method explained in the foregoing, provided means (for example electrothermal converter elements or a laser light) for generating thermal energy for the purpose of ink discharge and indicing a state change in the ink by such thermal energy, so that such system can achieve higher density and high definition in recording.

The principle and representative configuration of such recording method are disclosed, for example, in the U.S. Pat. Nos. 4,723,129 and 4,740,796. This system is applicable to so-called on-demand type recording or continuous type recording.

Above all, the case of the on-demand type recording is particularly effective. Namely, that is why, in the case, by applying at least one drive signal for giving rising of a rapid temperature over a film boiling temperature of the liquid corresponding to a recording information to an electrothermal converter disposed corresponding to a sheet or a liquid chanel holding a liquid (ink), a thermal energy is generated in the electrothermal converter to generate the film boiling at a heat action surface of the recording head, so that a bubble in the liquid (ink) corresponding to the drive signal can be formed, having relationship of one bubble to one drive signal. The ink is discharged through the discharge aperture by the growth and contraction of the bubble, thereby forming at least one liquid droplet. The drive signal is preferably formed by a pulse form, as it realizes instantaneous growth and contraction of the bubble, thereby attaining highly responsive discharge of the ink.

Such pulse-shaped drive signal is preferably that disclose in the U.S. Pat. Nos. 4,463,359 and 4,345,262. Also the conditions described in the U.S. Pat. No. 4,313,124 relative to the temperature increase rate of the heat action surface allows to obtain further improved recording.

The configuration of the recording head is given by the combinations of the liquid discharge apertures, liquid channels and electrothermal converter elements with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also are directed to a gist of the present invention. Furthermore the present invention is effective in a structure disclosed in the Japanese Patent Laid-Open Application No. 59-123670, having a slot common to plural electrothermal converter elements as a discharge aperture therefor, or in a structure disclosed in the Japanese Patent Laid-Open Application No. 59-138461, having an aperture for absorbing the pressure wave of thermal energy, in correspondence with each discharge aperture.

A full-line type recording head having a length corresponding to a maximum width of a recording medium to which data can be recorded by a recording apparatus may be constructed by plural recording heads so combined as to provide the required length as disclosed in the above-mentioned patents, or may be constructed as a single integrated recording head, and the present invention can more effectively exhibit its advantages in such recording head.

The present invention is furthermore effective in a recording head of interchangeable chip type, which can receive ink supply from the main apparatus and can be electrically connected therewith upon mounting on the main apparatus, or a recording head of cartridge type in which an ink tank is integrally constructed with the recording head itself.

Also the apparatus is preferably provided with the emission recovery means and other auxiliary means for the recording head, since the effects of the recording head of the present invention can be stabilized further. Examples of such means for the recording head include capping means, cleaning means, pressurizing or suction means, preliminary heating means composed of electrothermal converter element and/or another heating device, and means for effecting an idle ink discharge independent from the recording operation, all of which are effective for achieving stable drawing operation.

Furthermore, the recording head of the present invention is applicable, not only to liquid ink, but also to the ink which is solid below room temperature but softens or liquefies at room temperature, or which softens or liquefies within a temperature control range from 30 to 70° C., which is ordinarily adopted in the ink jet recording. Thus the ink only needs to be liquidous when the recording signal is applied.

Besides the recording head of the present invention can employ ink liquefied by thermal energy provided corresponding to the recording signal, such as the ink in which the temperature increased by thermal energy is intentionally absorbed by the state change from solid to liquid, or the ink which remains solid in the unused state for the purpose of prevention of ink evaporation, or the ink which starts to solidify upon reaching the substrate. In these cases, the ink may be held as solid or liquid in recesses or holes of a porous sheet, as described in the Japanese Patent Laid-Open Application Nos. 54-56847 and 60-71260, and placed in an opposed state to the electrothermal converter element. The present invention is most effective when the above-mentioned film boiling is induced in the ink of the above-mentioned forms.

What is claimed is:

1. A color filter producing apparatus comprising:
    a set of drawing heads for respectively generating ink jets of red, green and blue colors;
    distance detection means for detecting a distance in a Z-direction between a substrate on which a color filter is to be formed by drawing with said ink jets and said set of drawing heads;
    reaching position detecting means for detecting a reaching position on said substrate of each of ink jets discharged from said drawing heads;
    alignment error detecting means for detecting an error of alignment between said substrate and said drawing head in an XY-plane intersecting said Z-direction; and
    alignment means for effecting alignment between said substrate and said set of drawing heads in said Z-direction based on said detected distance by said distance detection means and effecting alignment between said substrate and said set of drawing heads in said XY-plane based on said detected alignment error by said alignment error detecting means.

2. An apparatus according to claim 1, wherein said drawing heads are fixed above said substrate, and said alignment means is adapted to move said substrate.

3. An apparatus according to claim 1, wherein, said drawing heads are aligned to predetermined positions to a surface of said substrate.

4. An apparatus according to claim 1, wherein a length of said drawing heads of red, green and blue colors is equal to a width of said substrate in a drawing direction.

5. An apparatus according to claim 1, wherein plural sets of the drawing heads are arranged in parallel manner, with an entire length thereof being equal to a width of said substrate in a drawing direction.

6. An apparatus according to claim 1, wherein said drawing heads are adapted to independently generate ink jets of red, green and blue colors, said alignment means is adapted to maintain a predetermined distance from said drawing heads to said substrate, and said relative displacement and said alignment are performed in directions of six degrees of freedom.

7. A color filter producing method comprising steps of:
    providing a color filter producing apparatus, said color filter producing apparatus comprising a set of drawing heads for respectively generating ink jets of red, green and blue colors; distance detection means for detecting a distance between a substrate on which a color filter is to be formed by drawing with said ink jets and said set of drawing heads in a Z-direction; reaching position detecting means for detecting a reaching position on said substrate of each of ink jets discharged from said drawing heads; alignment error detecting means for detecting an error of alignment between said substrate and said drawing head in an XY-plane intersecting said Z-direction; and alignment means for effecting alignment between said substrate and said at least a set of drawing heads in said Z-direction and effecting alignment between said substrate and said at least a set of drawing heads in said XY-plane based on said detected alignment error by said alignment error detecting means and said detected reaching position by said reaching position detecting means;
    detecting said reaching position on said substrate of said ink jet discharged from said drawing head; and
    effecting alignment between said substrate and said drawing head in said XY-plane based on said detected alignment error by said alignment error detecting means and said detected reaching position by said reaching position detecting means.

8. A method for producing a color filter by discharging a coloring material from an ink jet head to an optically translucent substrate thereby forming a plurality of colored filter elements with said coloring material, comprising:
    a first discharge step of discharging the coloring material with a predetermined pattern from said ink jet head under a scanning motion thereof relative to said optically translucent substrate for coloring said substrate;
    a detection step of detecting a reaching position of said coloring material in said first discharge step;
    a timing adjustment step of adjusting a timing of discharge of said ink jet head based on a result of detection of the reaching position of said coloring material detected in said detection step; and
    a second discharge step of discharging the coloring material from said ink jet head with the timing set in said timing adjustment step and scanning said ink jet head relative to said substrate, thereby coloring the filter elements on said substrate.

9. A method according to claim 8, wherein said ink jet head discharges the coloring material by utilizing thermal energy, and is provided with a thermal energy conversion member for generating thermal energy to be given to the coloring material.

10. A method for producing a color filter by discharging a coloring material from an ink jet head having plural discharge nozzles to an optically translucent substrate thereby forming a plurality of colored filter elements with said coloring material arranged on said substrate comprising:

a first discharge step of discharging the coloring material with a predetermined pattern from said ink jet head while scanning said ink jet head relative to said optically translucent substrate for coloring;

a detection step of detecting a reaching position on said optically translucent substrate of said coloring material in said first discharge step;

a posture adjustment step of adjusting a posture of said ink jet head based on the result of detection of the reaching position of said coloring material detected in said detection step; and a second discharge step of discharging the coloring material from said ink jet head with the posture set in said posture adjustment step and scanning said ink jet head relative to said substrate, thereby coloring the filter elements on said substrate.

11. A method according to claim 10, wherein said ink jet head discharges the coloring material by utilizing thermal energy, and is provided with a thermal energy conversion member for generating thermal energy to be given to the coloring material.

12. A color filter produced by the process of any of claims 7–11.

13. A liquid crystal display device, comprising the color filter according to claim 12;

a substrate opposed to said color filter; and a liquid crystal compound sealed between said color filter and said substrate.

14. A liquid crystal apparatus, comprising:

the liquid crystal display device according to claim 13; and image signal output means for outputting an image signal to said liquid crystal display device.

15. An apparatus for producing a color filter by forming a plurality of colored filter elements arranged on an optically translucent substrate comprising:

an ink jet head having a plurality of discharging nozzles for discharging a coloring material, moving relative to said substrate to color said filter elements;

detecting means for detecting a liquid droplet of said coloring material so as to detect a reaching position of said coloring material discharged by said ink jet head; and adjustment means for adjusting the posture of said ink jet head and a positional relationship among said plurality of discharging nozzles based on the result of detection of the reaching position of said coloring material detected by said detecting means.

16. An apparatus for producing a color filter by forming a plurality of colored filter elements arranged on an optically translucent substrate comprising:

an ink jet head for discharging a coloring material, moving relative to said substrate to color said filter elements;

detection means for detecting a liquid droplet of said coloring material so as to detect a reaching position of said coloring material discharged by said ink jet head; and adjustment means for adjusting the timing of discharge of said ink jet head based on the result of detection of the reaching position of said coloring material detected by said detection means, wherein said ink jet head is adapted to discharge the coloring material by utilizing thermal energy and provided with a thermal energy conversion member for generating thermal energy to be given to the coloring material.

17. An apparatus for producing a color filter by forming a plurality of colored filter elements arranged on an optically translucent substrate, comprising:

an ink jet head provided with plural discharge nozzles for discharging a coloring material onto said substrate, moving relative to said substrate to color said filter elements;

detection means for detecting a liquid droplet of said coloring material so as to detect a reaching position of said coloring material discharged by said ink jet head; and adjustment means for adjusting a position of one of said plurality of discharging nozzles of said ink jet head relative to a position of the other one thereof based on the result of detection of the reaching position of said coloring material detected by said detection means.

18. An apparatus according to claim 17, wherein said ink jet head is adapted to discharge the coloring material by utilizing thermal energy and is provided with a thermal energy conversion member for generating thermal energy to be given to the coloring material.

19. An apparatus for producing a color filter by forming a plurality of colored filter elements arranged on an optically translucent substrate comprising:

an ink jet head provided with plural discharge nozzles for discharging a coloring material moving relative to said substrate to color said filter elements; and adjustment means for three-dimensionally adjusting the posture of said ink jet head and a positional relationship among said plural discharge nozzles of said ink jet head.

20. An apparatus according to claim 19 further comprising detection means for detecting a reaching position of the coloring material discharged by said ink jet head.

* * * * *

UNITED STATES PATENT AND TRADEMARK OFFICE
CERTIFICATE OF CORRECTION

PATENT NO. : 5,984,470
DATED : November 16, 1999
INVENTOR(S) : SHIGEO SAKINO ET AL.

It is certified that error appears in the above-identified patent and that said Letters Patent is hereby corrected as shown below:

In the Drawing:

<u>SHEET 18</u>:

FIG. 23, "CALUCULATING" should read --CALCULATING--.

<u>SHEET 21</u>:

FIG. 26, "PATTEN" should read --PATTERN--,
"DRAWNN" should read --DRAWN-- and
"CALUCULATING" should read --CALCULATING--.

<u>COLUMN 2</u>:

Line 47, "a" should read --the--.

<u>COLUMN 8</u>:

Line 25, "plural" should read --a plural--.

<u>COLUMN 10</u>:

Line 57, "is functioned" should read --functions--; and
Line 64, "is functioned" should read --functions--.

<u>COLUMN 11</u>:

Line 40, "same" should read --the same--.

<u>COLUMN 12</u>:

Line 41, "same" should read --the same--; and
Line 43, "same" should read --the same--.

UNITED STATES PATENT AND TRADEMARK OFFICE
CERTIFICATE OF CORRECTION

PATENT NO.    : 5,984,470
DATED         : November 16, 1999
INVENTOR(S)   : SHIGEO SAKINO ET AL.

It is certified that error appears in the above-identified patent and that said Letters Patent is hereby corrected as shown below:

COLUMN 13:

Line 7, "head 206," should read --head 206;--;
    Line 31, delete "by the movement of the either in"; and
    Line 32, delete "these directions".

COLUMN 14:

Line 54, "shows" should read --show--.

COLUMN 15:

Line 30, "same" should read --the same--;
    Line 33, "adjustment:," should read --adjustment,--; and

COLUMN 16:

Line 46, "is" should read --are--.

COLUMN 17:

Line 63, "executed" should read --executing--; and
    Line 67, "involve" should read --involved--.

COLUMN 18:

Line 14, "indicing" should read --indicating--; and
    Line 39, "disclose" should read --disclosed--.

UNITED STATES PATENT AND TRADEMARK OFFICE
CERTIFICATE OF CORRECTION

PATENT NO. : 5,984,470

DATED : November 16, 1999

INVENTOR(S) : SHIGEO SAKINO ET AL.

It is certified that error appears in the above-identified patent and that said Letters Patent is hereby corrected as shown below:

<u>COLUMN 19</u>:

Line 33, "holded" should read --held--;
Line 65, "wherein," should read --wherein--.

Signed and Sealed this

Nineteenth Day of December, 2000

Attest:

Q. TODD DICKINSON

*Attesting Officer*       *Commissioner of Patents and Trademarks*